United States Patent
Goto

(10) Patent No.: US 8,948,380 B2
(45) Date of Patent: Feb. 3, 2015

(54) COMMUNICATION APPARATUS, CONTROL METHOD OF COMMUNICATION APPARATUS, COMPUTER PROGRAM, AND STORAGE MEDIUM

(75) Inventor: Fumihide Goto, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 13/120,535

(22) PCT Filed: Sep. 18, 2009

(86) PCT No.: PCT/JP2009/066861
§ 371 (c)(1),
(2), (4) Date: Mar. 23, 2011

(87) PCT Pub. No.: WO2010/035852
PCT Pub. Date: Apr. 1, 2010

(65) Prior Publication Data
US 2011/0170686 A1  Jul. 14, 2011

(30) Foreign Application Priority Data

Sep. 24, 2008 (JP) ................ 2008-244947

(51) Int. Cl.
*H04L 9/00* (2006.01)
*H04W 12/04* (2009.01)
(Continued)

(52) U.S. Cl.
CPC ............... *H04W 12/04* (2013.01); *H04L 9/08* (2013.01); *H04L 63/068* (2013.01); *H04N 1/4426* (2013.01); *H04L 9/0844* (2013.01); *H04L 9/0891* (2013.01); *H04N 1/44* (2013.01); *H04N 2201/0036* (2013.01); *H04N 2201/0039* (2013.01); *H04N 2201/0055* (2013.01); *H04W 84/18* (2013.01); *H04L 2209/80* (2013.01)
USPC ............................................. 380/44

(58) Field of Classification Search
CPC .......................... H04L 9/0819; H04L 63/062
USPC ........................................... 380/44
See application file for complete search history.

(56) References Cited

U.S. PATENT DOCUMENTS 7,577,103 B2 * 8/2009 Diaz et al. ............... 370/252
7,979,913 B2 * 7/2011 Jang et al. ............... 726/29

(Continued)

FOREIGN PATENT DOCUMENTS

JP   2004-104460 A    4/2004
JP   2006-311139 A   11/2006
JP   2008-219358 A    9/2008

OTHER PUBLICATIONS

U.S. Appl. No. 13/124,203, filed Apr. 14, 2011, Fumihide Goto.

(Continued)

*Primary Examiner* — Dant Shaifer Harriman
(74) *Attorney, Agent, or Firm* — Carter, DeLuca, Farrell & Schmidt, LLP

(57) ABSTRACT

The security level is enhanced without impairing user operability when executing an automatic communication parameter setting processing. A communication apparatus which configures a network serves as a providing apparatus which provides communication parameters to a receiving apparatus which receives the provided communication parameters. At this time, whether or not an encryption key, which is included in the communication parameters, is generated randomly is determined based on the participation status of the communication apparatus in the network.

13 Claims, 17 Drawing Sheets

(51) Int. Cl.
*H04L 9/08* (2006.01)
*H04L 29/06* (2006.01)
*H04N 1/44* (2006.01)
*H04W 84/18* (2009.01)

(56) References Cited

U.S. PATENT DOCUMENTS

| | | | |
|---|---|---|---|
| 8,218,769 B2* | 7/2012 | Takata et al. | 380/270 |
| 2006/0014498 A1* | 1/2006 | Yau et al. | 455/90.2 |
| 2006/0268744 A1 | 11/2006 | Sakai et al. | |
| 2013/0290180 A1* | 10/2013 | Baffier et al. | 705/40 |

OTHER PUBLICATIONS

U.S. Appl. No. 13/122,619, filed Apr. 5, 2011, Fumihide Goto.
U.S. Appl. No. 13/122,558, filed Apr. 4, 2011, Tatsuhiko Sakai.
U.S. Appl. No. 13/061,124, filed Feb. 25, 2011, Tatsuhiko Sakai.
U.S. Appl. No. 12/996,484, filed Dec. 6, 2010, Fumihide Goto.
U.S. Appl. No. 12/989,070, filed Oct. 21, 2010, Tatsuhiko Sakai.
U.S. Appl. No. 12/988,781, filed Oct. 20, 2010, Tatsuhiko Sakai.
Wi-Fi Protected Setup Specification, version 1.0h, Dec. 2006, 110 pages.
Wi-Fi Protected Access Enhanced Security Implementation Based on IEEE P802.11i standard-2004.

* cited by examiner

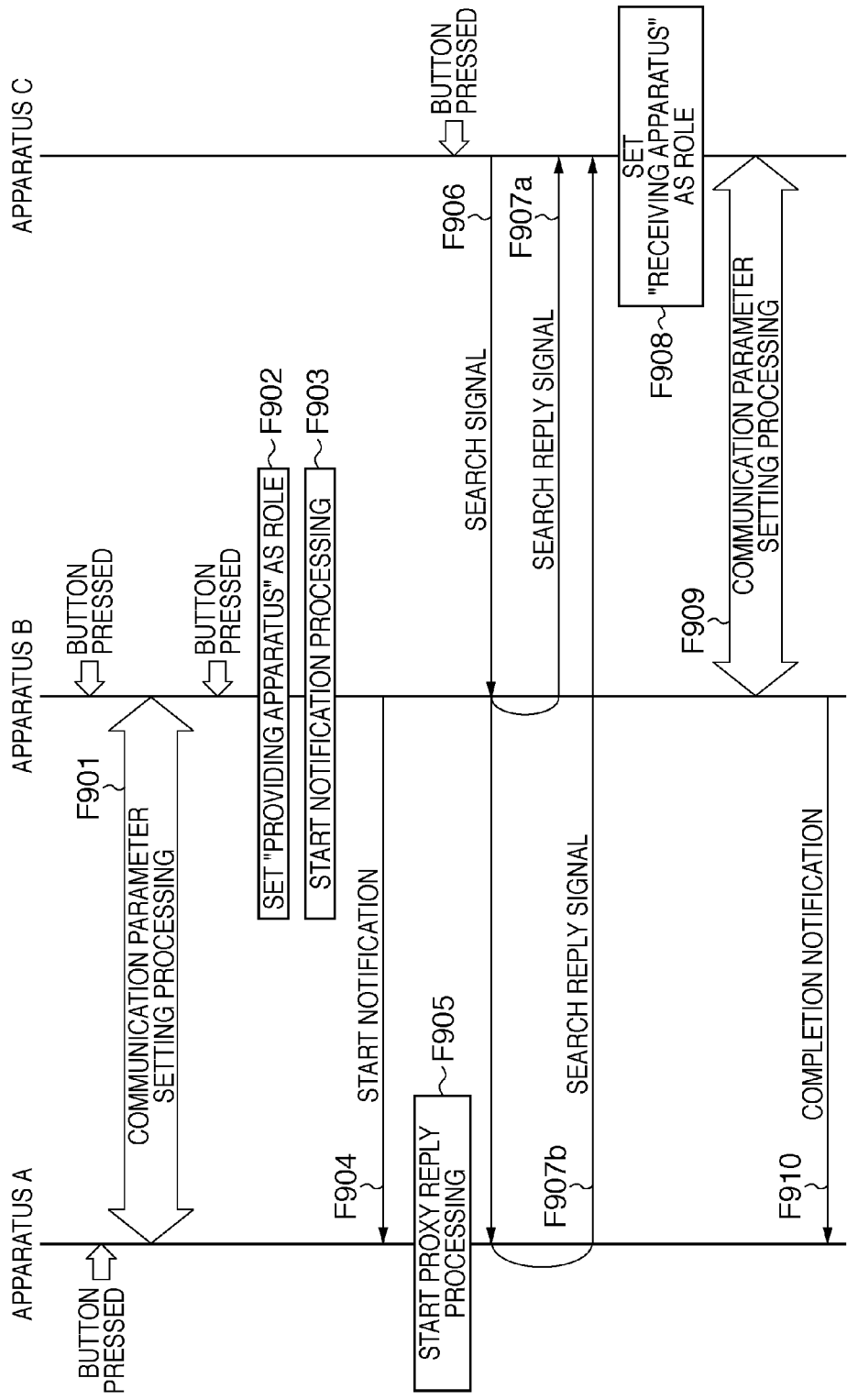

FIG. 10

SUPPORTED AUTHENTICATION / ENCRYPTION METHOD

| AUTHENTICATION METHOD | ENCRYPTION METHOD |
|---|---|
| Open | NO ENCRYPTION |
| | WEP |
| Shared | WEP |
| WPA | TKIP |
| | CCMP |
| WPA-PSK | TKIP |
| | CCMP |
| WPA2 | TKIP |
| | CCMP |
| WPA2-PSK | TKIP |
| | CCMP |

F I G. 11

NUMBER OF HELD KEYS

| METHOD | pairwise key | group key | total |
|---|---|---|---|
| IEEE802. 11i full spec | n − 1 | n + 1 | 2n |
| (1) reduce Seq | n − 1 | n + 1 | 2n |
| (2) reduce Key | n − 1 | 1 | n |
| (3) WPA-None | 0 | 1 | 1 |
| (4) WPA Key Exchange over WPS handshake | n − 1 | n + 1 or 1 | 2n or n |

NUMBER OF KEY EXCHANGES EXECUTED PER OTHER APPARATUS

| METHOD | 4-Way Handshake | Group key Handshake |
|---|---|---|
| IEEE802. 11i full spec | 2 | 2 |
| (1) reduce Seq | 1 | 2 |
| (2) reduce Key | 1 or 2 | 1 |
| (3) WPA-None | 0 | 0 |
| (4) WPA Key Exchange over WPS handshake | 0 | 0 or 1 or 2 |

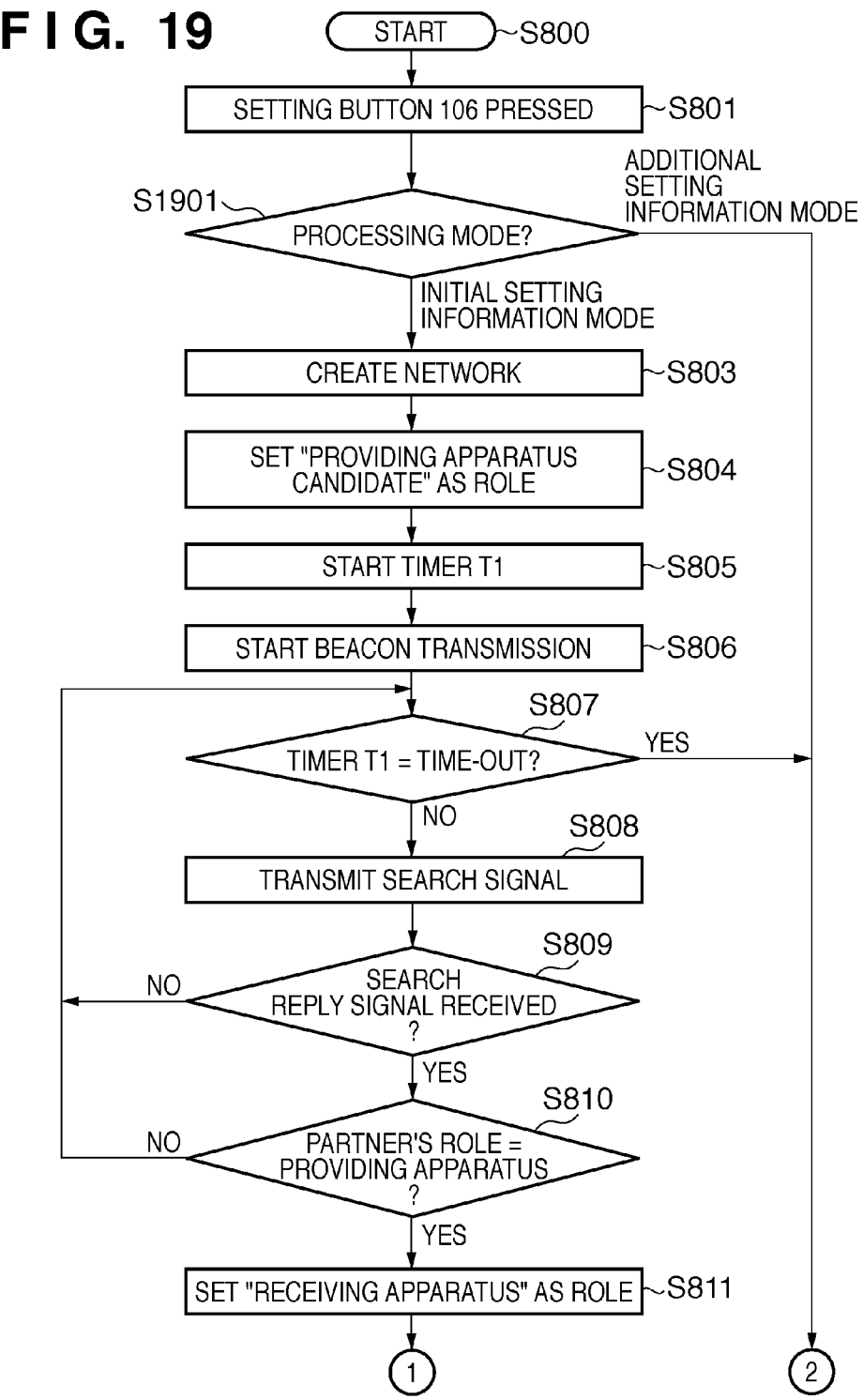

COMMUNICATION APPARATUS, CONTROL METHOD OF COMMUNICATION APPARATUS, COMPUTER PROGRAM, AND STORAGE MEDIUM

TECHNICAL FIELD

The present invention relates to a communication apparatus, a control method of a communication apparatus, a computer program, and a storage medium.

BACKGROUND ART

In wireless communications represented by wireless LANs compliant with the IEEE802.11 standard series, there are many setting items which have to be set before use. For example, such setting items include communication parameters required to make wireless communications such as an SSID as a network identifier, encryption method, encryption key, authentication method, and authentication key, and it is very troublesome for the user to manually input these parameters.

Hence, various manufacturers have proposed automatic setting methods that allow the user to easily set communication parameters in wireless apparatuses. With these automatic setting methods, one apparatus provides communication parameters to the other apparatus using procedures and messages, which are determined in advance between the apparatuses to be connected, thus automatically setting the communication parameters.

Japanese Patent Laid-Open No. 2006-311139 (to be referred to as patent reference 1 hereinafter) discloses an example of automatic communication parameter setting processing in a communication in a wireless LAN Ad Hoc mode (to be referred to as an Ad Hoc communication hereinafter). Wi-Fi CERTIFIED for Wi-Fi Protected Setup: Easing the User Experience for Home and Small Office Wi-Fi Networks, http://www.wi-fi.org/wp/wifi-protected-setup (to be referred to as non-patent reference 1 hereinafter) discloses "Wi-Fi Protected Setup" (to be abbreviated as WPS hereinafter) as the industry standard specification of the automatic communication parameter setting processing between an access point (base station) and station (terminal station). Also, Wi-Fi Protected Access Enhanced Security Implementation Based on IEEE P802.11i standard (to be referred to as non-patent reference 2 hereinafter) discloses "Wi-Fi Protected Access" (to be abbreviated as WPA hereinafter) as the industry standard specification of an encryption method, encryption key, authentication method, authentication key, and the like in wireless communication connection processing.

Use of an automatic communication parameter setting technique can improve user convenience. However, particularly when the communication parameter to be provided is an encryption key, a security vulnerability may result if one apparatus always provides identical communication parameters.

Hence, in order to enhance security, a new encryption key, for example, may be generated every time the automatic communication parameter setting processing is executed. In this case, the security level of a communication channel between communication parameter providing and receiving apparatuses can be improved.

However, when executing the automatic communication parameter setting processing with a plurality of communication apparatuses, a different shared encryption key is generated in each automatic communication parameter setting processing. Therefore, communication parameter receiving apparatuses cannot communicate with each other.

DISCLOSURE OF INVENTION

The present invention has been made in consideration of the afore-described problems, and one embodiment of the present invention provides a communication apparatus which can improve the security level without impairing user operability when executing an automatic communication parameter setting processing.

According to one aspect of the present invention, there is provided a communication apparatus which configures a network, characterized by comprising: providing means for providing communication parameters to a receiving apparatus which receives the provided communication parameters; generation means for randomly generating an encryption key included in the communication parameters; and determination means for determining based on a participation status of the communication apparatus in a network whether or not an encryption key is generated by the generation means.

According to another aspect of the present invention, there is provided a method of controlling a communication apparatus which configures a network, characterized by comprising: a providing step of providing communication parameters to a receiving apparatus which receives the provided communication parameters; a generation step of randomly generating an encryption key included in the communication parameters; and a determination step of determining based on a participation status of the communication apparatus in a network whether or not an encryption key is generated in the generation step.

Further features of the present invention will become apparent from the following description of exemplary embodiments with reference to the attached drawings.

BRIEF DESCRIPTION OF DRAWINGS

FIG. 9 is a sequence chart showing the operations of apparatuses A, B, and C according to the embodiment of the present invention;

FIG. 10 is a table of supported authentication and encryption methods;

FIG. 11 is a comparison table of possessed keys and key exchange sequences in key exchange algorithms;

FIG. 19 is a flowchart showing an automatic communication parameter setting operation according to the fourth embodiment.

BEST MODE FOR CARRYING OUT THE INVENTION

First Embodiment

A communication apparatus according to this embodiment will be described in detail hereinafter with reference to the drawings. An example using a wireless LAN system complaint with the IEEE802.11 series will be described hereinafter, but a communication mode is not always limited to a wireless LAN compliant with the IEEE802.11.

The hardware arrangement in a case example suited to this embodiment will be described below.

Figure 1:
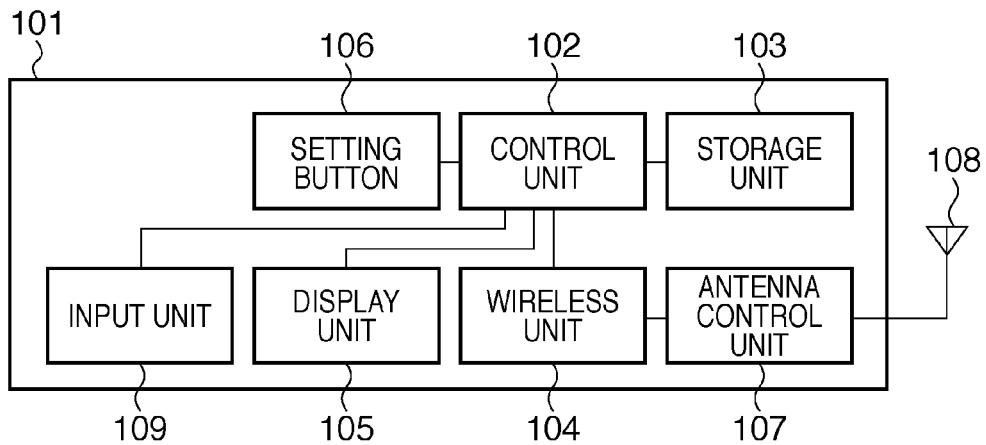
FIG. 1 is a block diagram showing the arrangement of an apparatus.

FIG. 1 is a block diagram showing an example of the arrangement of a communication apparatus (providing apparatus or receiving apparatus) which can be connected to a communication network, according to an embodiment of the present invention. Reference numeral 101 denotes a whole apparatus. Reference numeral 102 denotes a control unit which controls the whole apparatus by executing a computer program stored in a storage unit 103. The control unit 102 also executes communication parameter setting control with another apparatus. Reference numeral 103 denotes a storage unit which stores the computer program to be executed by the control unit 102, and various kinds of information such as communication parameters. Various operations to be described later are implemented when the control unit 102 executes the computer program stored in the storage unit 103.

Reference numeral 104 denotes a wireless unit used to make wireless communications. Reference numeral 105 denotes a display unit which makes various displays, and has a function that can output visually perceivable information like an LCD or LED or can output audible information like a loudspeaker.

Reference numeral 106 denotes a setting button which gives a trigger to start communication parameter setting processing. The control unit 102 executes processing to be described later when it detects a user's operation of the setting button 106.

Reference numeral 107 denotes an antenna control unit; and 108, an antenna. Reference numeral 109 denotes an input unit which allows the user to make various inputs.

Figure 2:
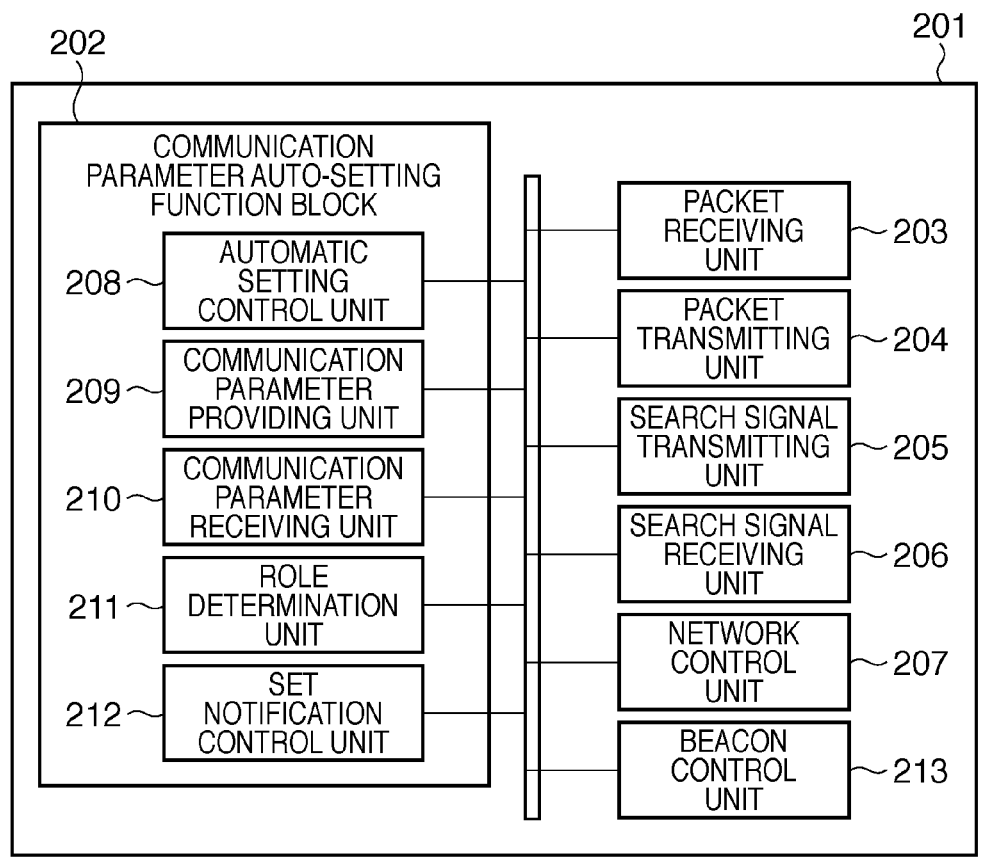
FIG. 2 is a block diagram showing software functions in the apparatus according to an embodiment of the present invention.

FIG. 2 is a block diagram showing an example of the arrangement of software functional blocks to be executed by respective apparatuses to be described later in a communication parameter setting operation to be described later.

Reference numeral 201 denotes a whole apparatus. Reference numeral 202 denotes a communication parameter auto-setting function block. In this embodiment, the communication parameter auto-setting function block 202 automatically sets communication parameters required to make wireless communications such as an SSID as a network identifier, encryption method, encryption key, authentication method, and authentication key.

Reference numeral 203 denotes a packet receiving unit which receives packets associated with various communications. The packet receiving unit 203 receives a beacon (notification signal). Reference numeral 204 denotes a packet transmitting unit which transmits packets associated with various communications. The packet transmitting unit 204 transmits a beacon. Note that the beacon is added with various kinds of information (self-information) of a transmission source apparatus.

Reference numeral 205 denotes a search signal transmitting unit which controls transmission of an apparatus search signal such as a probe request. Note that the probe request can also be expressed as a network search signal used to search for a desired network. The search signal transmitting unit 205 transmits the probe request. Also, the search signal transmitting unit 205 transmits a probe response as a reply signal to the received probe request.

Reference numeral 206 denotes a search signal receiving unit which controls reception of an apparatus search signal such as a probe request from another apparatus. The search signal receiving unit 206 receives the probe request. Also, the search signal receiving unit 206 receives a probe response. Note that the apparatus search signal and its reply signal are added with various kinds of information (self-information) of a transmission source apparatus.

Reference numeral 207 denotes a network control unit which controls network connections. The network control unit 207 executes, for example, connection processing to a wireless LAN Ad Hoc network.

In the communication parameter auto-setting function block, reference numeral 208 denotes an automatic setting control unit which controls various protocols in automatic communication parameter setting processing.

Reference numeral 209 denotes a communication parameter providing unit which provides communication parameters to a partner apparatus. The communication parameter providing unit 209 executes providing processing in the automatic communication parameter setting processing (to be described later) under the control of the automatic setting control unit 208. Reference numeral 210 denotes a communication parameter receiving unit which receives communication parameters from a partner apparatus. The communication parameter receiving unit 210 executes receiving processing in the automatic communication parameter setting processing (to be described later) under the control of the automatic setting control unit 208.

The automatic setting control unit 208 also determines whether or not an elapsed time period after the beginning of the automatic communication parameter setting processing exceeds a limit time of that setting processing. When it is determined that the elapsed time period exceeds the limit time, the setting processing is aborted under the control of the automatic setting control unit 208.

Reference numeral 211 denotes a role determination unit which determines a role in the automatic communication parameter setting processing. The role determination unit 211 executes role determination processing to be described later.

Reference numeral 212 denotes a set notification control unit which controls processing associated with start and completion notifications of the automatic communication parameter setting processing. The set notification control unit 212 executes transmitting/receiving processing of a start notification message, start notification reply message, and completion notification message in a providing apparatus to be described later.

Reference numeral 213 denotes a beacon control unit which controls the transmission timings of a beacon (notification signal). A beacon transmission algorithm in an Ad Hoc network of an IEEE802.11 wireless LAN will be described below.

Beacons are transmitted in an autonomous distributed manner in the Ad Hoc network among all apparatuses which configure the network. A beacon transmission interval (beacon cycle) is determined by an apparatus which created the Ad Hoc network first, and beacons are normally transmitted from arbitrary apparatuses at an interval of about 100 ms. Note that the Ad Hoc network is formed when one arbitrary apparatus begins to transmit beacons.

The beacon transmission timings are controlled by a parameter called a contention window (a random number generation range; to be abbreviated as CW hereinafter). When a beacon transmission timing is reached, each apparatus in the network calculates a random value (CWrand) within the range from 0 to the CW. A time period obtained by multiplying a predetermined constant interval (slot time) by this CWrand is set as a waiting time period (backoff time period) until beacon transmission.

As the waiting time period until beacon transmission is decremented by the slot time, when the waiting time period reaches zero, a beacon is transmitted. If the apparatus receives a beacon from another apparatus before it transmits a beacon, the apparatus aborts the transmitting processing of a beacon.

With this control, collisions of beacons transmitted from respective apparatuses can be avoided. Since respective apparatuses on the Ad Hoc network select random numbers within the range from 0 to the CW, an apparatus, which selects a smallest CWrand, of those that configure the network transmits a beacon.

For example, when an identical CW is set in the respective apparatuses as an initial value, the respective apparatuses have equal beacon transmission probabilities and, as a result, the numbers of times beacons are transmitted per unit time by the respective apparatuses become nearly the same. In other words, the transmission frequencies (transmission ratios) of beacons by the respective apparatuses become the same.

On the other hand, when one apparatus on the network sets the CW to be a value smaller than the initial value, the probability that this apparatus transmits a beacon becomes higher than other apparatuses. That is, the CW can be expressed as a parameter used to determine the probability that a beacon is transmitted or the number of times beacons are transmitted per unit time.

Also, the CW can be expressed as a parameter used to determine the transmission ratio of beacons transmitted by each apparatus. Furthermore, the CW can also be expressed as a parameter used to determine the beacon transmission timing or a waiting time period until beacon transmission.

Note that the CW value can be changed within the range from CWmin (minimum value) to CWmax (maximum value). When the CWmin is set, the number of times beacons are transmitted per unit time is maximized. In each apparatus, CWinit (>CWmin) is set as an initial value, and beacons are transmitted using the initial value while no automatic communication parameter setting processing is executed.

Figure 3:
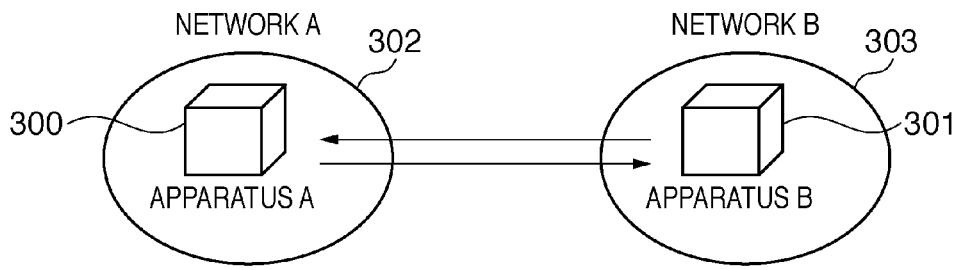
FIG. 3 is a diagram showing the first network arrangement according to the embodiment of the present invention.

FIG. 3 is a diagram showing a communication apparatus A 300 (to be referred to as apparatus A hereinafter) and communication apparatus B 301 (to be referred to as apparatus B hereinafter). All these apparatuses have the arrangements shown in FIGS. 1 and 2 described above.

Both apparatuses A and B respectively create a network A 302 (to be referred to as network A hereinafter) and a network B 303 (to be referred to as network B hereinafter) in a state in which whether they serve as a communication parameter providing apparatus or a receiving apparatus is not determined.

Apparatuses A and B discover each other's apparatus, and arbitrate which apparatus serves as a providing apparatus. As a result, the apparatus which serves as the providing apparatus provides communication parameters to that which serves as the receiving apparatus.

Networks A and B are Ad Hoc networks respectively created by apparatuses A and B. The Ad Hoc network is called an IBSS (Independent Basic Service Set), and respective networks are distinguished using BSSIDs as network identifiers. The BSSID is a network identifier which assumes a random value generated by an apparatus that creates a network. Note that an SSID is a network identifier which can be set in advance in an apparatus or can be set to be an arbitrary value by the user, and is different from the BSSID. As can be seen from the above description, the BSSID is not a communication parameter which is provided from the providing apparatus to the receiving apparatus by the automatic communication parameter setting processing.

Figure 4:
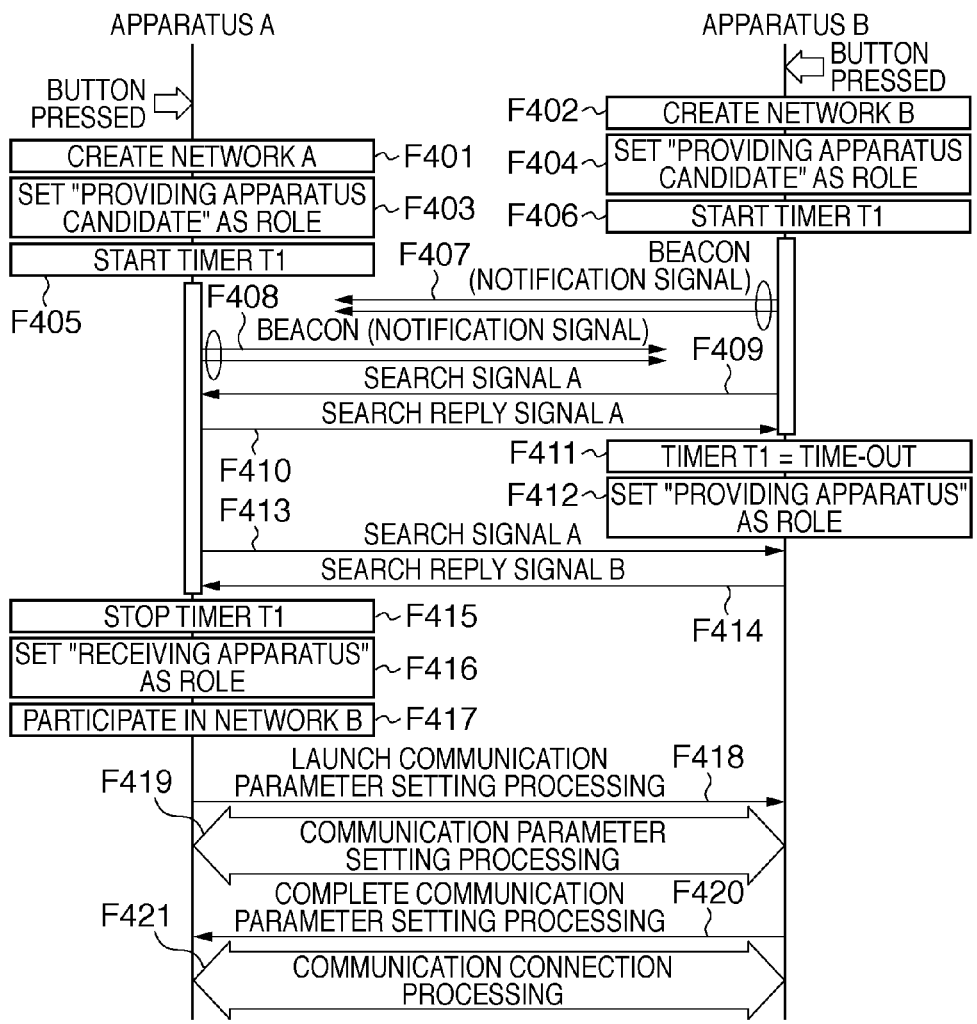
FIG. 4 is a sequence chart showing the operations of apparatuses A and B according to the embodiment of the present invention.

FIG. 4 is a chart showing an example of the processing sequence when the setting buttons 106 are pressed on apparatuses A and B, and the automatic communication parameter setting processing is executed between apparatuses A and B.

When the setting buttons 106 are respectively pressed on apparatuses A and B, apparatus A creates unique network A (F401), and apparatus B also creates unique network B (F402). Assume that the setting button 106 of apparatus B is pressed earlier, and apparatus B creates a network first.

Each of apparatuses A and B is set as "providing apparatus candidate" indicating that their operation role (to be referred to as a role hereinafter) is settled neither as a providing apparatus nor a receiving apparatus (F403, F404), and starts a timer T1 as an arbitration time for determining the operation role (F405, F406).

Apparatuses A and B transmit beacons (notification signals) (F407, F408). A beacon signal includes an information element which notifies that the apparatus has an automatic communication parameter setting processing function in the created network or the automatic setting processing is in progress. Also, the beacon may also include an information element indicating "providing apparatus candidate" as the current role.

Since these beacons include different BSSIDs in correspondence with networks A and B, the apparatus which received the beacon can recognize a network to which the transmission source apparatus of that beacon belongs.

Subsequently, apparatus B transmits search signal A (F409). The search signal A also includes an information element indicating that the apparatus has an automatic communication parameter setting processing function or the automatic setting processing is in progress, and an information element indicating "providing apparatus candidate" as the current role, as in the beacon.

Upon reception of search signal A transmitted from apparatus B, apparatus A transmits search reply signal A to apparatus B (F410). The search reply signal A also includes an information element indicating that the apparatus has an automatic communication parameter setting processing function or the automatic setting processing is in progress, and an information element indicating "providing apparatus candidate" as the current role, as in the beacon and search signal A.

When the timer T1 as the arbitration time of the operation role of apparatus B has reached a time-out (F411), apparatus B sets "providing apparatus" as its operation role (F412).

Apparatus A transmits search signal A in turn (F413). Search signal A transmitted from apparatus A also includes an information element indicating that the sender has an automatic communication parameter setting processing function or the automatic setting processing is in progress, and an information element indicating "providing apparatus candidate" as the current role.

Upon reception of search signal A transmitted from apparatus A, apparatus B transmits search reply signal B to apparatus A (F414). Search reply signal B includes an information element indicating that the sender has an automatic communication parameter setting processing function or the automatic setting processing is in progress, and an information element indicating the current role, as in the beacon and search signal A. At this time, since apparatus B determines "providing apparatus" as its operation role, search reply signal B includes an information element indicating "providing apparatus". In addition to the information element indicating "providing apparatus" as the role, an information element indicating that the given apparatus is ready to provide communication parameters may be added.

Apparatus A receives search reply signal B transmitted from apparatus B, and confirms that the role of apparatus B is "providing apparatus", and apparatus B is ready to provide communication parameters. Hence, apparatus A stops the arbitration timer T1 (F415), sets "receiving apparatus" as its role (F416), and participates in network B created by apparatus B (F417). Then, apparatuses A and B can exchange communication messages (protocol messages) to be exchanged in automatic communication parameter setting protocol processing.

In this embodiment, when arbitrating the role of the communication parameter providing apparatus or receiving apparatus between apparatuses A and B, the search signal and search reply signal are used.

However, in place of exchanging the search signal and search reply signal, the discovery processing and arbitration processing may be executed by a passive scan in which the apparatuses exchange only beacons so as to reduce transmission opportunities.

Then, apparatus A transmits a communication parameter setting launch message to apparatus B (F418), so as to execute communication parameter setting processing between apparatus A as the receiving apparatus and apparatus B as the providing apparatus (F419). As a result, apparatus B transmits communication parameters to apparatus A, and transmits a communication parameter setting completion message to apparatus A (F420). In this way, the communication parameter setting processing is complete.

Note that this embodiment includes a description "communication parameter setting processing". It is clearly specified that detailed communication protocol processing of that processing can be implemented using communication protocol processing specified by an industry-standard communication parameter setting processing, as described in non-patent reference 1. Then, apparatuses A and B execute communication connection processing using the shared communication parameters (F421).

Note that since the communication connection processing is started simultaneously with the end of the communication parameter setting processing, apparatuses A and B can communicate with each other without forcing the user to perform any operations. In this case, an apparatus may transmit a connection request signal which explicitly indicates the start of communication connection processing. In the ad hoc mode, since no association processing is executed unlike in an infrastructure mode, the apparatus as a request source of connection can be promptly recognized upon reception of the connection request signal.

In this embodiment, apparatus B transmits communication parameters indicating the same network as network B to apparatus A, and the communication connection processing is executed using these communication parameters. In this case, when apparatus A transmits a connection request signal to apparatus B, apparatus B can detect that apparatus A is participating in network B, and can also easily obtain the number of participants.

Before the start of communication connection processing, the apparatus may confirm with the user whether or not to start connection, and may start the communication connection processing in accordance with a user's operation.

Furthermore, apparatus B may transmit, to apparatus A, communication parameters which indicate a network different from network B. In this case, communication connection processing is started in response to detection of another apparatus on the network defined by shared communication parameters as a trigger, thus avoiding wasteful connection processing.

Figure 8A:
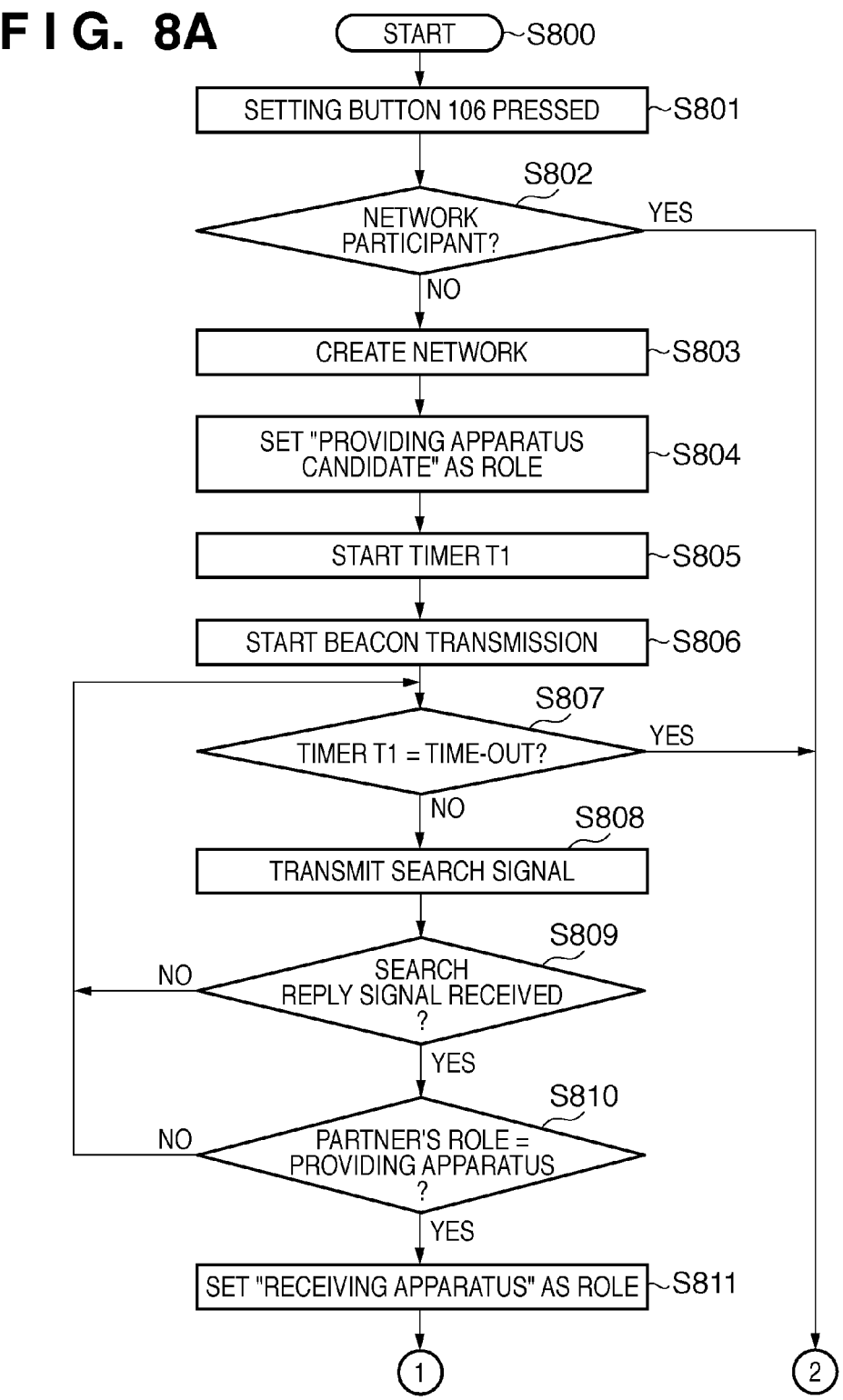
FIGS. 8A and 8B are flowcharts showing an automatic communication parameter setting operation according to the embodiment of the present invention.
Figure 8B:
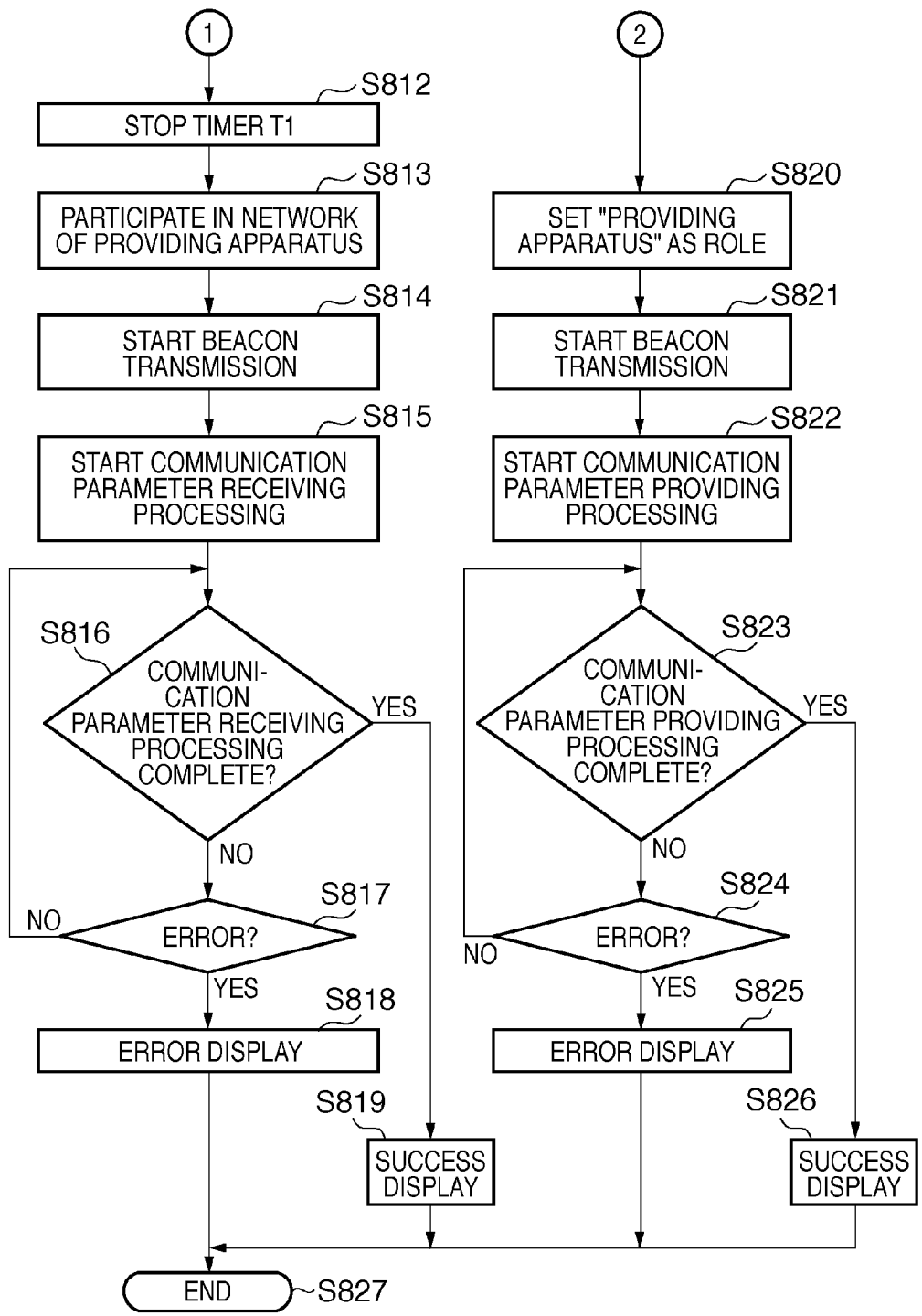

FIGS. 8A and 8B are a flowchart showing an example of the operation sequence executed when the setting buttons 106 are pressed on apparatuses A and B, the operation roles of apparatuses A and B, that is, the providing apparatus and receiving apparatus are arbitrated, and the automatic communication parameter setting processing is then executed.

Control executed by these two apparatuses will be described below with reference to this flowchart.

The setting button 106 which indicates the start of communication parameter setting processing is pressed (S801).

The apparatus on which the setting button 106 has been pressed checks if it is already a participant of a network at present (S802). If the given apparatus is already a participant of the network, it sets "providing apparatus" as its role (S820) and starts beacon transmission (S821) so as to allow another new apparatus to participate in the participating network.

Then, the given apparatus starts communication parameter providing processing for a new apparatus which wants to participate in the network (S822). Note that when the given apparatus is already a participant of the network at present, it launches the start notification processing shown in FIG. 6 (to be described later). That is, in the communication parameter providing processing started in step S822, when the given apparatus is already a participant of the network, it provides communication parameters of the network of which it is a participant. Assume that a beacon (notification signal), search signal (probe request), and search reply signal (probe response) include the following information elements as mandatory elements or options depending on signals:

an information element which notifies that the given apparatus has an automatic communication parameter setting processing function or the automatic setting processing is in progress;

an information element indicating the role of the given apparatus; and an information element indicating whether or not a providing function is active.

On the other hand, if the given apparatus does not participate in any network, it creates a network so as to arbitrate the operation role (S803), sets "providing apparatus candidate" as the role (S804), and starts the timer T1 used in role arbitration (S805).

After the timer T1 is started in step S805, the given apparatus starts beacon transmission (S806). Note that the beacon may include an information element indicating "providing apparatus candidate" as the current role.

Furthermore, if the timer T1 has not reached a time-out yet (S807), the given apparatus transmits a search signal (probe request) (S808), and waits for reception of a search reply signal (probe response) (S809).

The given apparatus checks if the partner's role included in an information element of the received search reply signal is "providing apparatus" (S810). If the partner's role is "providing apparatus", the given apparatus sets "receiving apparatus" as its role (S811), and stops the timer T1 (S812).

Subsequently, the given apparatus participates in a network created by the providing apparatus (S813), and starts beacon transmission by itself (S814). Then, the given apparatus starts communication parameter receiving processing of parameters received from the providing apparatus (S815).

If the given apparatus cannot discover any apparatus whose role is "providing apparatus" before the timer T1 reaches a time-out (S807), it sets "providing apparatus" as its role (S820).

If the given apparatus sets "providing apparatus" as its role, it starts transmission of a beacon indicating "providing apparatus" (S821), and starts communication parameter providing processing (S822). In the communication parameter providing processing started in step S822, if the given apparatus is not a participant of a network, it provides communication parameters of the network created in step S803.

The apparatus whose role is "receiving apparatus" confirms if the communication parameter receiving processing is complete (S816). If the communication parameter receiving processing is complete, the apparatus indicates it has succeeded by controlling the display unit 105 to display a success message on an LCD, to flash or light an LED, to change the color of the LED, or to generate an arbitrary sound (S819), thus ending the processing (S827). If an error has occurred (S817), the apparatus indicates this by similarly controlling the display unit 105 to display an error message on an LCD, to flash or light an LED, to change the color of the LED, or to generate an arbitrary sound (S818), thus ending the processing (S827).

On the other hand, if the apparatus whose role is "providing apparatus" confirms that the communication parameter providing processing is complete (S823), it indicates this by controlling the display unit 105 to display a completion message on an LCD, to flash or light on an LED, to change the color of the LED, or to generate an arbitrary sound (S826), thus ending the processing (S827). If an error has occurred (S824), the apparatus indicates this by similarly controlling the display unit 105 to display an error message on an LCD, to flash or light an LED, to change the color of the LED, or to generate an arbitrary sound (S825), thus ending the processing (S827).

Note that in steps S808 to S810, the method is explained by which a providing apparatus, which has started the communication parameter setting processing, is searched for by waiting for reception of a probe response to a probe request (active scan). Since a providing apparatus that is executing the communication parameter setting processing transmits a beacon added with additional information, that is an automatic communication parameter setting processing, a receiving apparatus may use a method of waiting for reception of that transmitted beacon for a predetermined period of time (passive scan).

When the communication parameter providing apparatus transmits communication parameters to the communication parameter receiving apparatus in step S822, not only the communication parameters indispensable to communication connection processing but also a validity time duration (synonymous with "available period") of the communication parameters may be transmitted together. The communication parameter receiving apparatus which received the validity time duration together ends communication connection processing when the validity time duration has elapsed. Alternatively, the receiving apparatus may not only end the communication connection processing but also discard the received communication parameters. Note that the validity time duration described here is not limited to time information but may also be the number of times the software that runs on a given communication apparatus is launched or the number of times communication connection processing is performed. In cases where the number of times said software is launched or the number of times communication connection processing is performed is received as the validity time duration, the received communication parameters are discarded after the end of software processing or disconnection of communication connection processing, which is executed the number of times indicated by the validity time duration.

Likewise, when the communication parameter providing apparatus transmits communication parameters to the communication parameter receiving apparatus in step S822, holding limitation information, which indicates whether or not to allow the receiving apparatus to store the communication parameters in a storage device, may be transmitted together. The communication parameter receiving apparatus which received the holding limitation information executes processing for discarding the communication parameters after the communication connection processing is completed without holding the communication parameters in the storage unit 103 of the apparatus.

A case will be described below wherein a new apparatus is added to the pre-established ad hoc network using the automatic communication parameter setting processing.

Figure 5:
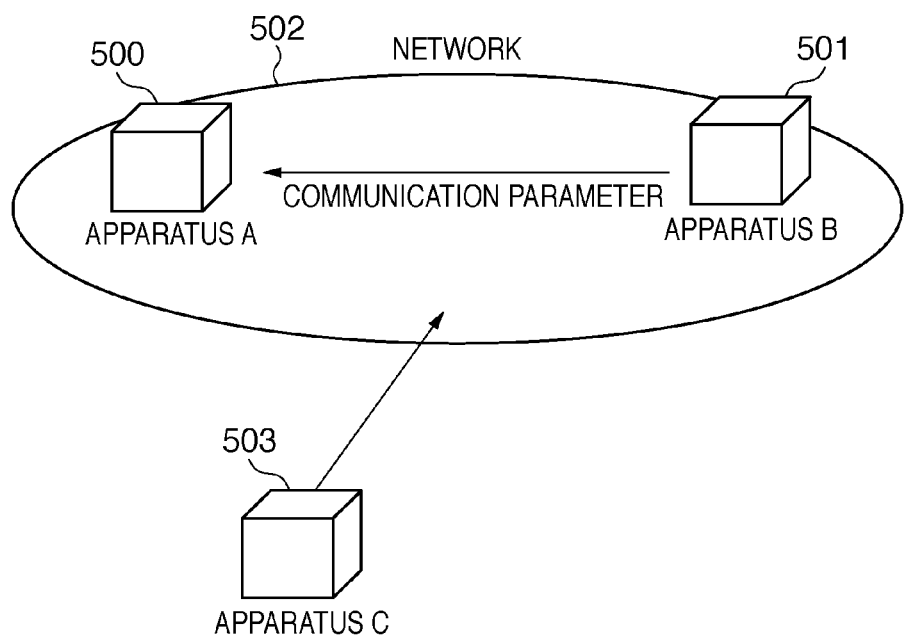
FIG. 5 is a diagram showing the second network arrangement according to the embodiment of the present invention.

FIG. 5 is a diagram showing a first communication apparatus A 500 (to be referred to as apparatus A hereinafter), second communication apparatus B 501 (to be referred to as apparatus B hereinafter), third communication apparatus C 503 (to be referred to as apparatus C hereinafter), and network 502. Apparatuses A, B, and C have the aforementioned arrangements shown in FIGS. 1 and 2.

A case will be examined below wherein when apparatus C is about to participate in the network 502 configured by apparatuses A and B, the setting buttons of apparatuses B and C are operated.

Figure 6:
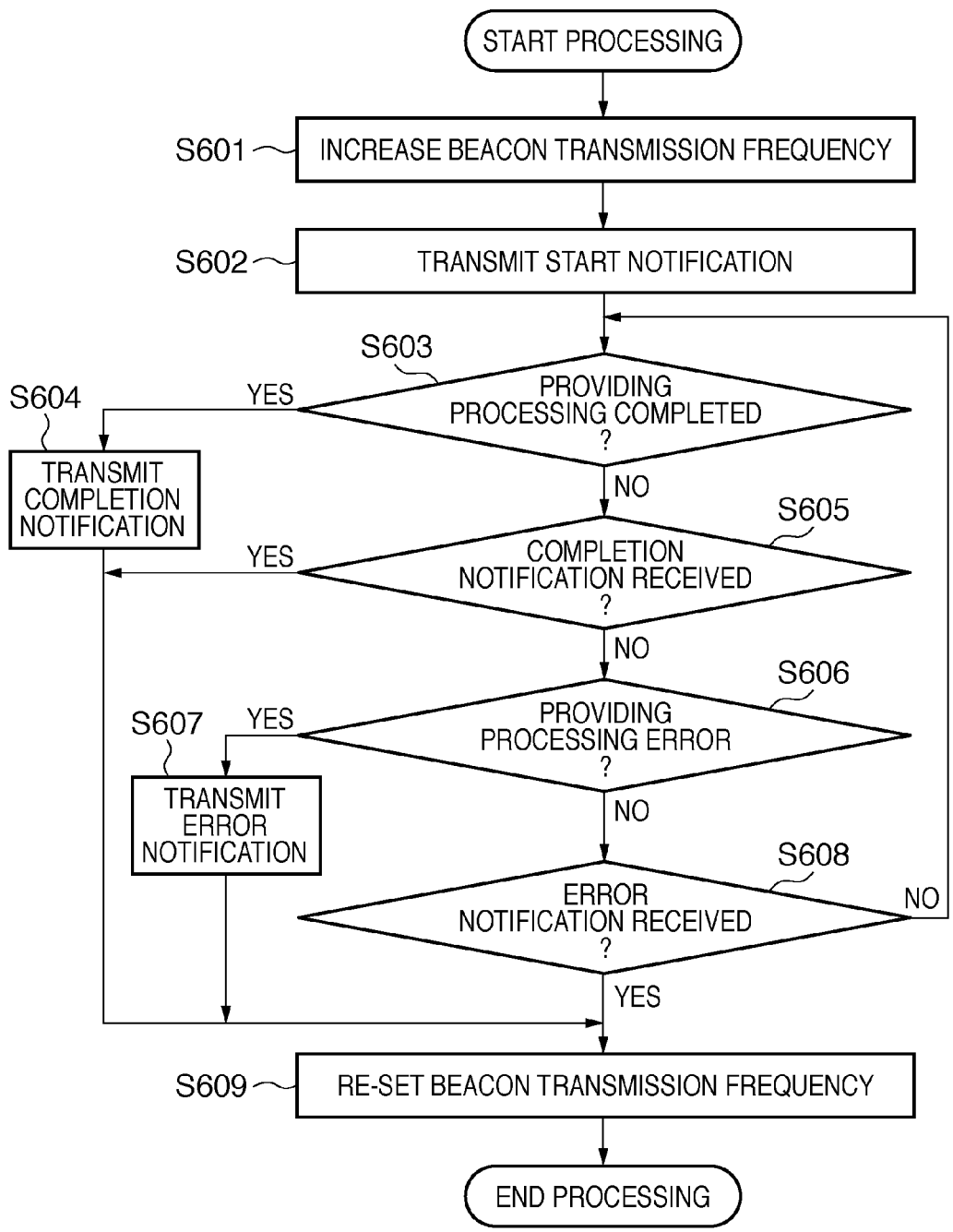
FIG. 6 is a flowchart showing the notification processing operation of a providing apparatus according to the embodiment of the present invention.

FIG. 6 is a flowchart for explaining the notification processing operation of a providing apparatus. When an apparatus is already a participant of the network in step S802 in FIG. 8A, that apparatus starts the processing shown in FIG. 6.

When the processing is started, the beacon control unit 213 of the providing apparatus increases the beacon transmission frequency (transmission ratio, the number of times of transmission) per unit time by the providing apparatus (S601).

Note that the Ad Hoc network of the IEEE802.11 wireless LAN specifies that an apparatus which returns a probe response is an apparatus which transmitted a beacon immediately before reception of a probe request.

Then, in step S601 the providing apparatus sets the CW to be a value smaller than the initial value. With this setting, the number of times beacons are transmitted per unit time by the providing apparatus becomes larger than other apparatuses which are participants of the network. As a result, in the providing apparatus search processing (steps S808 to S810 in FIG. 8A) by a new apparatus as a prospective participant, a probe response from the providing apparatus can be detected within a short period of time.

In this manner, since the beacon transmission frequency of the providing apparatus is increased, when a new apparatus as a prospective participant searches for a providing apparatus, it can receive a probe response from the providing apparatus at a higher probability. When the new apparatus as a prospective participant searches for a providing apparatus by a passive scan, it can receive a beacon from the providing apparatus at a higher probability.

As a result, the probability that the limit time of the communication parameter setting processing elapses while a new apparatus as a prospective participant cannot detect the providing apparatus can be reduced. When the new apparatus as the prospective participant can detect a providing apparatus within a short period of time, a time period required until completion of the communication parameter providing processing can be shortened.

After that, the providing apparatus broadcasts a start notification message that notifies the start of the automatic communication parameter setting processing (S602). Note that the providing apparatus may unicast this start notification message to each apparatus as a participant of the network. This start notification message can also be expressed as a message which notifies that apparatus B started an operation as a providing apparatus.

The providing apparatus waits until the launched providing processing is terminated as an error (S606), the communication parameter providing processing to the receiving apparatus is complete (S603), or it receives an error notification or completion notification message from another apparatus (S605, S608).

If the providing processing has succeeded, that is, if the communication parameter providing processing to the receiving apparatus is complete (S603), the providing apparatus broadcasts a completion notification message (S604). Note that the providing apparatus may unicast this completion notification message to each apparatus as a participant of the network.

If the providing apparatus transmits the completion notification message in step S604 or it receives a completion notification message from another apparatus (S605), the process jumps to step S609.

If the providing processing has failed (S606), the providing apparatus broadcasts an error notification message (S607). Note that the providing apparatus may unicast the error notification message to each apparatus as a participant of the network.

If the providing apparatus transmits the error notification message in step S607 or it receives an error notification message from another apparatus (S608), the process advances to step S609.

In step S609, the beacon control unit 213 of the providing apparatus re-sets the CW to be the initial value to restore the beacon transmission frequency increased in step S601 (S609). Note that the re-setting timing of the CW to the initial value is not particularly limited as long as the CW is re-set after the beginning of the providing processing. That is, the CW may be re-set immediately after the beginning of the processing, after completion of the providing processing, or after an error. If the CW is re-set immediately after the beginning of the processing, since the beacon transmission frequency (the number of times of transmission) is decreased, consumption power required for beacon transmission can be efficiently reduced. The start notification message transmitted in step S602 is repetitively transmitted until the providing processing is terminated as an error, communication parameters are provided to the receiving apparatus, or a notification message is received from another apparatus.

Figure 7:
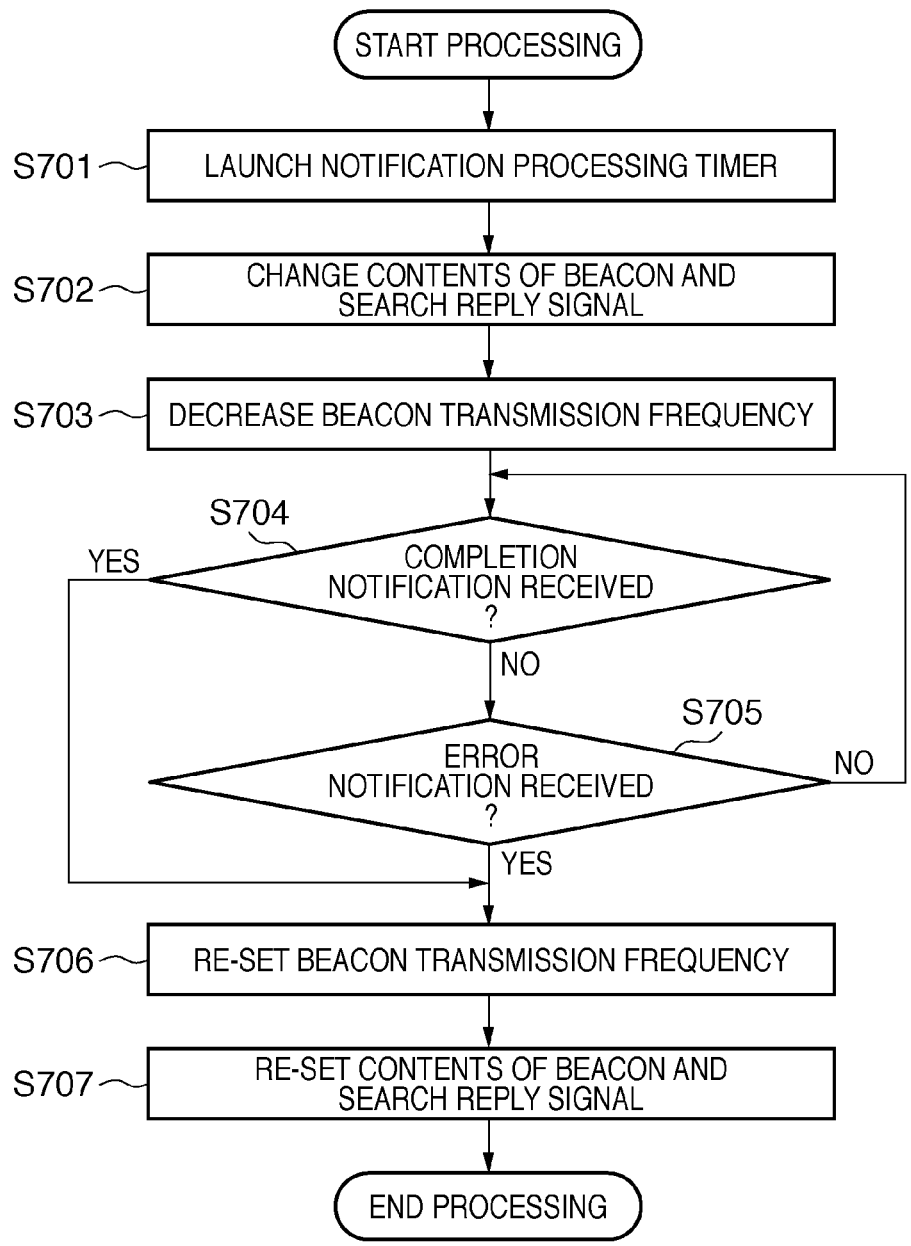
FIG. 7 is a flowchart showing a proxy reply operation according to the embodiment of the present invention.

FIG. 7 is a flowchart for explaining the proxy reply processing operation of an apparatus (apparatus A) as a participant of the network other than the providing apparatus. When apparatus A receives the start notification message, the processing shown in FIG. 7 is started.

Upon detection of reception of the start notification message, the automatic setting control unit 208 of apparatus A launches a timer used to determine if a limit time of processes to be described in steps S702 to S707 has elapsed (S701).

The automatic setting control unit 208 then changes the contents of information to be included in a beacon and search reply signal (probe response) to be transmitted (S702). In step S702, the automatic setting control unit 208 adds identification information used to uniquely identify a providing apparatus (apparatus B) to the beacon and search reply signal to be transmitted. As the identification information, for example, MAC address information of the providing apparatus is stored. In this way, even when apparatus A which is not a providing apparatus returns a search reply signal, an apparatus as a transmission source of a search signal can detect the presence of a providing apparatus.

The beacon control unit 213 sets the CW to be a value larger than the initial value (S703) to decrease the beacon transmission frequency (transmission ratio).

Hence, the number of times beacons are transmitted per unit time by the apparatus as a participant of the network other than the providing apparatus is smaller than the providing apparatus. As a result, in the providing apparatus search processing (steps S808 to S810 in FIG. 8A) by a new apparatus as a prospective participant, a probe response from the providing apparatus can be detected within a short period of time.

After that, apparatus A waits for a completion notification message or error notification message transmitted from the providing apparatus (S704, S705). Upon reception of the notification message, the beacon control unit 213 of apparatus A re-sets (restores) the CW to be the initial value to restore the beacon transmission frequency decreased in step S703 (S706). Furthermore, the automatic setting control unit 208 restores the contents of information to be included in a beacon and search reply signal to be transmitted to those before change in step S702 (S707). That is, the automatic setting control unit 208 removes the identification information which is used to uniquely identify the providing apparatus (apparatus B) and is added to the beacon and search reply signal to be transmitted.

Note that if the timer set in step S701 has reached a time-out, the receiving apparatus aborts the processes in steps S702 to S707. If the processes in steps S702 and S703 have already been done at the timer time-out timing, the re-setting processing is executed as in steps S706 and S707.

FIG. 9 is a sequence chart for explaining the operations of the respective apparatuses in this embodiment. Apparatus A receives communication parameters provided from apparatus B by the automatic communication parameter setting process, and is already a participant of the network 502 defined by those communication parameters (F901). Apparatus C has not undergone the communication parameter providing processing yet.

When the user operates the setting button of apparatus B, apparatus B launches the processing shown in FIGS. 8A and 8B (F902). Since apparatus B is already a participant of the network 502 established by the automatic communication parameter setting processing, it sets "providing apparatus" as its role, and starts communication parameter providing processing (F902).

After the communication parameter providing processing is started, apparatus B launches the notification processing shown in FIG. 6 (F903). After the notification processing is launched, apparatus B transmits a start notification message, and increases the beacon transmission frequency (F904).

Apparatus A which received the start notification message launches the proxy reply processing shown in FIG. 7, and decreases the beacon transmission frequency (F905).

In this manner, when apparatus B increases the beacon transmission frequency and apparatus A decreases the beacon transmission frequency, apparatus C as a new prospective participant can detect apparatus B as the providing apparatus within a shorter period of time.

When the user operates the setting button 106 of apparatus C, apparatus C launches the processing shown in FIGS. 8A and 8B, and transmits a search signal (F906).

On the network 502, apparatus A or B returns a search reply signal in response to the search signal transmitted from apparatus C (F907a, F907b).

When apparatus A returns a search reply signal, it returns a search reply signal in which is stored the identification information (MAC address) of apparatus B as the providing apparatus (F907b). When apparatus B returns the search reply signal, it returns the search reply signal which stores information indicating that apparatus A is the providing apparatus (F907a). In this way, even when apparatus C receives the search reply signals from any apparatuses on the network 502, it can surely detect apparatus B as the providing apparatus.

Upon detection of the presence of the providing apparatus, apparatus C sets "receiving apparatus" as its role, and launches communication parameter receiving processing (F908). Then, apparatus C receives communication parameters required to make communications on the network 502 from apparatus B as the providing apparatus (F909).

After apparatus B provides the communication parameters to apparatus C, it transmits a completion notification message (F910). After transmission of the completion notification message, apparatus B restores the beacon transmission frequency increased in F903. Upon reception of the completion notification message, apparatus A restores the beacon transmission frequency decreased in F905.

As described above, the user can automatically control apparatus C to participate in the network 502 by operating only the setting button 106.

Note that FIG. 9 has explained the case in which the setting button 106 of apparatus B is operated. Also, a case in which the setting button 106 of apparatus A is operated may be assumed. Even when the setting button 106 of apparatus A is operated, since apparatus A becomes the providing apparatus via step S802 in FIG. 8A, it can add apparatus C to the network 502 in the same manner as in FIG. 9.

With the aforementioned processing, the communication apparatuses can easily share the communication parameters. As described above, by operating the setting buttons 106 on apparatuses A and B, communication connection processing is executed between apparatuses A and B to configure the network 502.

The communication connection processing may be automatically started after completion of the communication parameter setting processing, as described above, or it may be started in response to a re-pressing operation of the setting button 106 or a connection command entry by the input unit 109.

Note that the communication connection processing differs depending on the authentication method and encryption method of the shared communication parameters.

In this embodiment, combinations adopted as the authentication method and encryption method are as shown in, for example, FIG. 10.

Open authentication is an authentication method defined as "Open System Authentication" in the IEEE802.11 standard, and please refer to the IEEE802.11 standard for details. Shared authentication is an authentication method defined as "Shared Key Authentication" in the IEEE802.11 and IEEE802.11i standards, and uses a WEP protocol as an encryption method.

Note that "WEP" is an abbreviation for "Wired Equivalent Privacy", and please refer to the IEEE802.11 or IEEE802.11i standard for details. Also, a WPA authentication method, WPA-PSK authentication method, WPA2 authentication method, and WPA2-PSK authentication method are the standards of authentication methods specified by the Wi-Fi Alliance. These methods are based on an RSNA (Robust Security Network Association) in the IEEE802.11i standard.

"TKIP" is an abbreviation for "Temporal Key Integrity Protocol". Also, "CCMP" is an abbreviation for "CTR with CBC-MAC Protocol", and uses an AES protocol as an encryption method. "AES" is an abbreviation for "Advanced Encryption Standard".

Please refer to the Wi-Fi Alliance specification or test specification for details of these methods. The WPA-PSK and WPA2-PSK authentication methods are those using a pre-shared key. The WPA and WPA2 authentication methods require user authentication by an authentication server, which is prepared separately, and acquire an encryption key of a communication channel from the authentication server. Please refer to the IEEE802.11i standard for details of these methods.

The connection processing method differs depending on authentication methods. The authentication methods that can be supported currently include six different methods, that is, the Open authentication, Shared authentication, WPA authentication, WPA-PSK authentication, WPA2 authentication, and WPA2-PSK authentication, as shown in the table. Of these methods, the WPA authentication and WPA2 authentication, and the WPA-PSK authentication and WPA2-PSK authentication are essentially the same authentication methods. For this reason, the WPA and WPA2 authentication methods and the WPA2 and WPA2-PSK authentication methods are considered as the same methods, and four different authentication methods (Open, Shared, WPA, and WPA-PSK) will be explained below.

However, since the WPA authentication requires an independent authentication server which is externally set, and executes authentication processing with that authentication server, complicated processing is required when all communication apparatuses operate on an equal footing like in the present invention. Hence, a description of the WPA authentication will not be given.

In this embodiment, the Open authentication, Shared authentication, and WPA-PSK authentication will be respectively explained below.

The Open authentication will be described first. In the Open authentication, communication apparatuses set communication parameters shared by the automatic communication parameter setting processing, and search for each other's apparatus to configure an IBSS network.

The Shared authentication will be described below. A detailed description of the Shared authentication will not be given since it is included in the IEEE802.11 and IEEE802.11i specifications. Upon carrying out the Shared authentication, a Requester and Responder have to be determined.

In the infrastructure mode, an STA (station) operates as a Requester, and an AP (access point) operates as a Responder. On the other hand, in the Ad Hoc mode, no AP exists. For this reason, in order to implement the Shared Key Authentication in the IBSS network, the STA has to include a Responder function and a Requester/Responder role determination algorithm.

This Requester/Responder role determination algorithm may adopt the same method as that of a Supplicant/Authenticator role determination algorithm in the WPA-PSK authentication to be described later. For example, in the automatic communication parameter setting processing, a communication parameter providing apparatus may serve as a Responder, and a communication parameter receiving apparatus may serve as a Requester.

Figure 12:
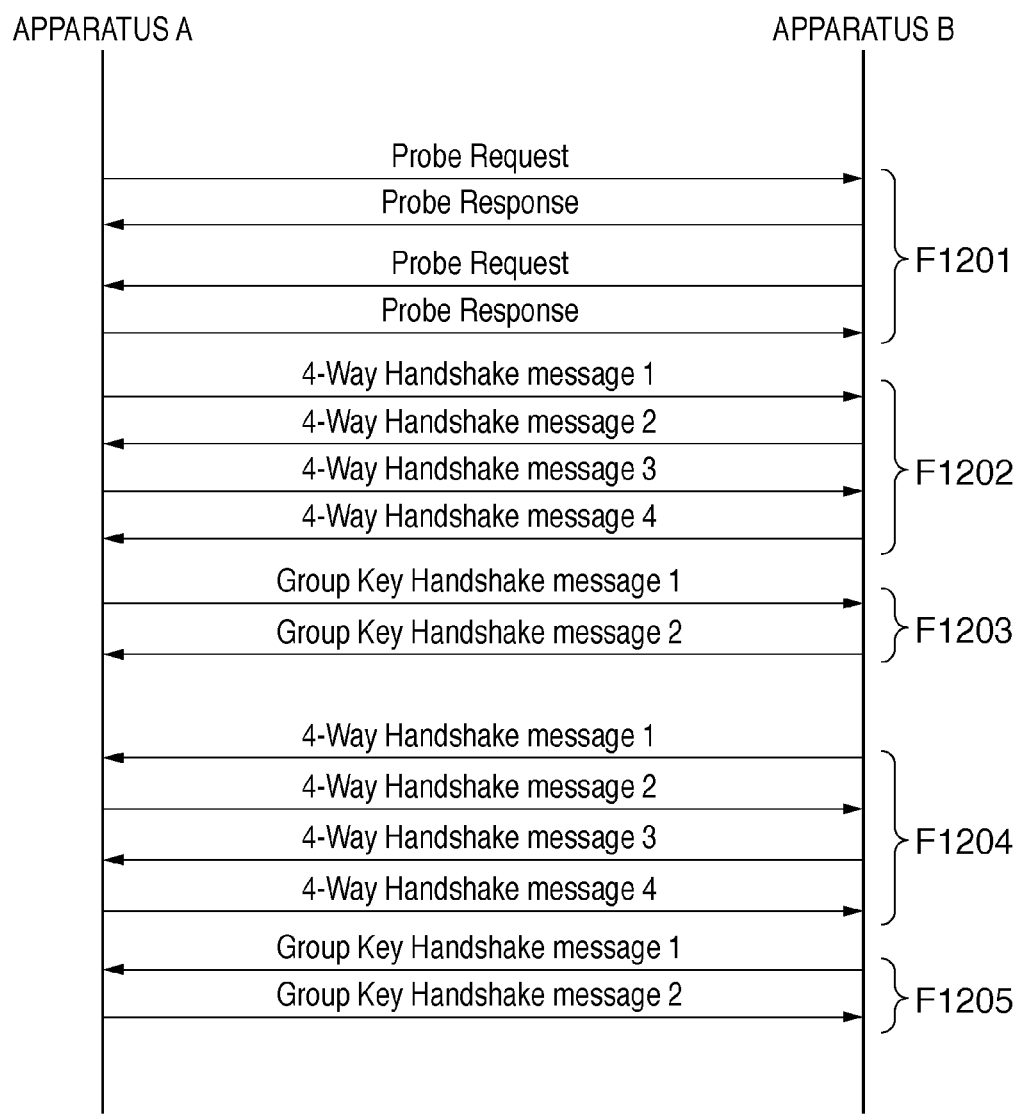
FIG. 12 is a sequence chart (No. 1) for key exchange processing.

Finally, the WPA-PSK authentication will be explained. The WPA-PSK authentication is standardized in the IEEE802.11i and WPA, and an operation method in the IBSS network is also specified. FIG. 12 describes a sequence specified in the IEEE802.11i. Please refer to the IEEE802.11i standard for details, and an overview will be explained below.

Assume that apparatuses A and B which complete the automatic communication parameter setting processing exist. After completion of the automatic communication parameter setting processing, communication connection processing is executed using the automatically set communication parameters automatically or in response to a user operation.

Apparatuses A and B search for each other's partner (F1201). If these apparatuses can recognize with each other, one of apparatuses A and B, which has a larger MAC address, serves as an Authenticator, and the other apparatus serves as a Supplicant. Then, apparatuses A and B execute first 4-way handshake processing and group key handshake processing (F1202 and F1203).

Note that the 4-way handshake processing is a mechanism which exchanges random numbers between the Authenticator and Supplicant, and generates an encryption key of a unicast packet called a pairwise key based on a pre-shared key for each session. The group key handshake processing is a mechanism which sends an encryption key of a multicast packet or broadcast packet possessed by the Authenticator.

After that, apparatuses A and B exchange the roles of the Authenticator and Supplicant, and execute 4-way handshake processing and group key handshake processing again (F1204 and F1205). With the above processes, apparatuses A and B are allowed to make encrypted communications.

In this way, in case of the method fully compliant with the IEEE802.11i specification, since the 4-way handshake processing and group key handshake processing are repeated a plurality of number of times, the overall processing becomes redundant. Since the redundant processing and the role determination algorithm are executed, much time is required until completion of connection. Hence, a method for reducing the redundant processing and shortening a processing time can also be used.

There are some such methods, and in this case, the following four methods will be explained:

First method: 4-way handshake processes are combined into once;

Second method: Group keys are combined into one per network;

Third method: All of group keys and pairwise keys are combined to one; and

Fourth method: Key exchange is executed together in the automatic communication parameter setting processing.

FIG. 11 shows differences of the numbers of times of key exchange sequences and the numbers of possessed pairwise keys and group keys by the aforementioned four methods.

The number of possessed keys will be explained first. When an Ad Hoc IBSS network including n communication apparatuses is fully compliant with the IEEE802.11i, n−1 pairwise keys as many as the number of other communication apparatuses are required. As for group keys, in addition to group keys as many as the number of other communication apparatuses, a total of two group keys, that is, a current group key and an immediately preceding group key for the apparatus are required. Thus, n+1 group keys are required in total. The reason why the two group keys for the apparatus are required is that an apparatus having different group keys exists in an identical network in a transition period depending on the group key handshake progress status.

In the first method, only the number of sequences is reduced, and the number of possessed keys remains unchanged.

In the second method, n−1 pairwise keys are similarly required, and only one group key is required in all.

In the third method, since a group key is used intact as a pairwise key, the number of pairwise keys becomes zero, and only one group key is possessed.

In the fourth method, n−1 pairwise keys are similarly required. Since respective apparatuses may possess group keys, or one group key in all, n+1 group keys or only one group key may be required on a case-by-case basis.

The number of key exchange sequences executed per other apparatus will be described below. In case of the method fully compliant with the IEEE802.11i, 4-way handshake processing is executed twice and group key handshake processing is executed twice, as has been described using FIG. 12.

In the first method, the number of times 4-way handshake processing is executed as redundant processing is reduced to one. The group key handshake processing is still executed twice.

In the second method, since only one combined group key is used in the network, that key need only be distributed to a new terminal. Hence, the group key handshake processing is executed once. Also, the 4-way handshake processing may be executed once according to the first method, or twice in two ways according to the IEEE802.11i standard.

In the third method, since one key which is set in advance is used as a pairwise key and group key, no key exchange sequence is executed.

In the fourth method, since processing equivalent to key exchange processing is done in the WPS automatic communication parameter setting processing, no independent 4-way handshake processing is executed. The group key handshake processing is executed an arbitrary number of times.

As has been described with reference to FIG. 11, these methods are advantageous in terms of the number of key exchange sequences and the number of possessed keys compared to the aforementioned method fully compliant with the IEEE802.11i standard.

The aforementioned four methods will be described in detail below using the sequence charts.

Figure 13:
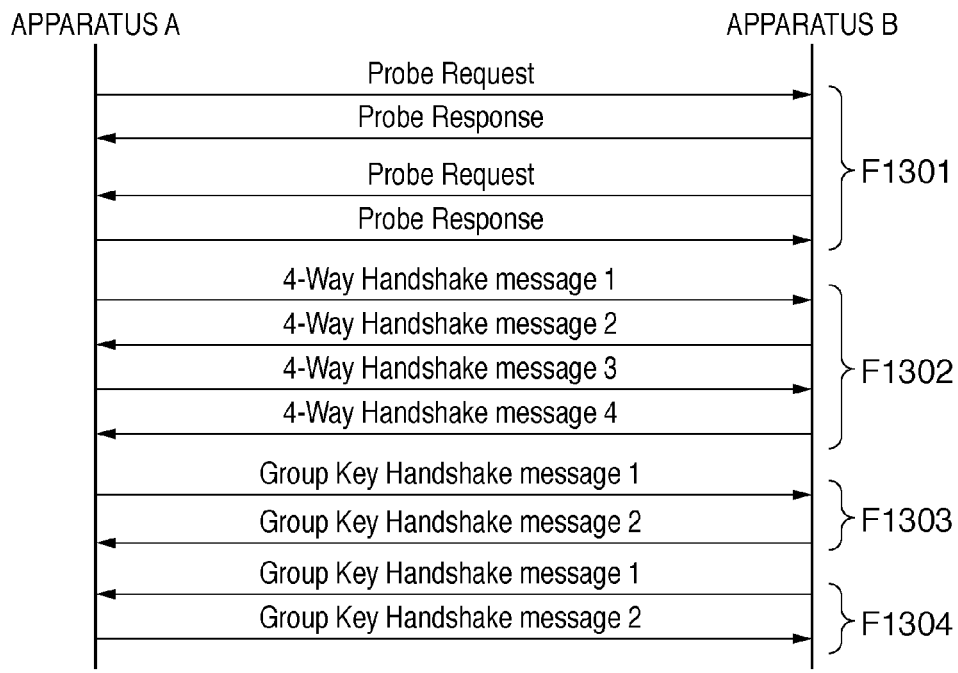
FIG. 13 is a sequence chart (No. 2) for key exchange processing.

The first method will be described below with reference to FIG. 13.

Assume that apparatuses A and B which complete the automatic communication parameter setting processing exist. After completion of the automatic communication parameter setting processing, communication connection processing is executed using the automatically set communication parameters automatically or in response to a user operation.

Apparatuses A and B search for each other's partner (F1301). If these apparatuses can recognize with each other, one of apparatuses A and B, which has a larger MAC address, serves as an Authenticator, and the other apparatus serves as a Supplicant. Then, apparatuses A and B execute 4-way handshake processing and one group key handshake processing (F1302 and F1303).

After that, apparatuses A and B exchange the roles of the Authenticator and Supplicant, and execute the group key handshake processing again (F1304). With the above processing, communications are allowed.

As described above, with the first method, the number of times the 4-way handshake processing is executed, which is twice per apparatus pair in the IEEE802.11i specification, is reduced to one.

Since the 4-way handshake processing is required to share a pairwise key between communication apparatuses which execute 4-way handshake processing, if that processing is continuously executed twice, security cannot be improved, resulting in redundant processing. Hence, in the first method, the conventional method is changed, and the number of times 4-way handshake processing is executed is reduced to one, thereby shortening a time required for normal connection processing.

Figure 14:
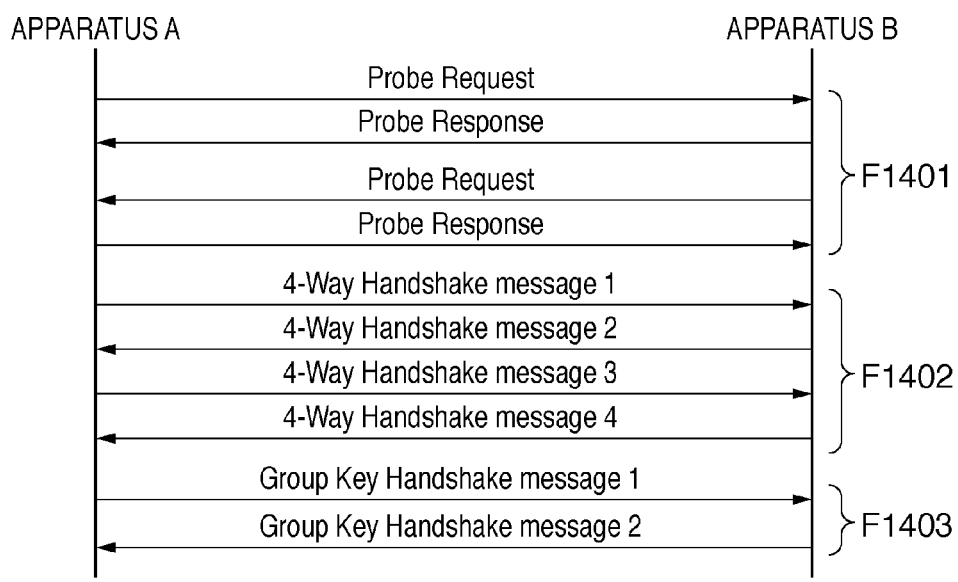
FIG. 14 is a sequence chart (No. 3) for key exchange processing.

The second method will be described below with reference to FIG. 14. Assume that apparatuses A and B which complete the automatic communication parameter setting processing exist. After completion of the automatic communication parameter setting processing, communication connection processing is executed using the automatically set communication parameters automatically or in response to a user operation.

Apparatuses A and B search for each other's partner (F1401). If these apparatuses can recognize with each other, one of apparatuses A and B, which has a larger MAC address, serves as an Authenticator, and the other apparatus serves as a Supplicant. Then, apparatuses A and B execute 4-way handshake processing and group key handshake processing (F1402 and F1403). With the above processing, communications are allowed.

In the IEEE802.11i specification, different group keys are set for respective communication apparatuses. However, in the second method, only one combined group key per network is used.

Pairwise keys are prepared for respective communication channels, but one group key is commonly used per network. As a result, the group key handshake processing, which has to be executed twice in the method compliant with the IEEE802.11i, need only be executed once. Since only one group key is set, the encryption/description processing of a broadcast packet and multicast packet becomes simple because a different key need not be held for each apparatus which transmitted such packets.

The third method is the same as WPA-None (Optional IBSS Global Pre-Shared Key System) described in non-patent reference 2.

Since details of the WPA-None are described in the aforementioned reference, a detail description thereof will not be given. In the normal WPA, a random number is applied to an element as a source of a pairwise key by 4-way handshake processing to generate a session key. On the other hand, in the WPA-None, an element as a source of a pairwise key is applied intact as a session key.

That is, a large characteristic feature of the third method lies in that no key exchange processing is executed. Hence, the security becomes lower than the normal WPA connection processing, which generates a session key for each connection. Hence, when this method is adopted, the automatic communication parameter setting processing is launched for each connection, and communication keys of the shared communication parameters are randomly generated for each connection, thereby improving the security.

Figure 15:
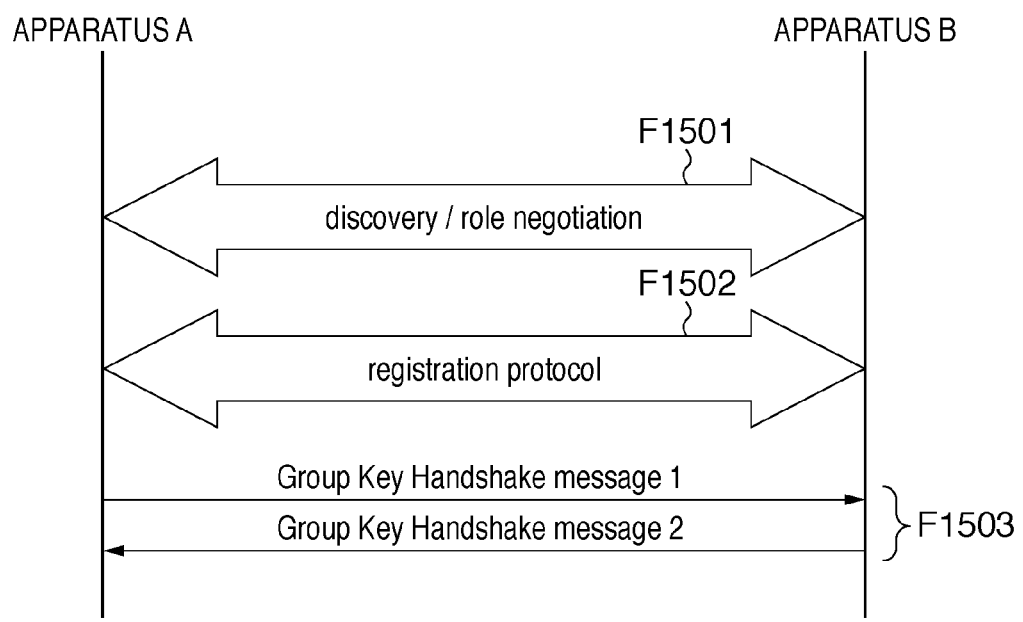
FIG. 15 is a sequence chart (No. 4) for key exchange processing.

The fourth method will be described below with reference to FIG. 15. As described previously using FIG. 4, the communication partner search processing and role determination processing in the automatic communication parameter setting processing are executed (F1501). Subsequently, by the automatic communication parameter setting processing, communication parameters are transferred from a communication parameter providing apparatus to a communication parameter receiving apparatus (F1502). During the processing in F1502, key exchange processing, which is not executed in the conventional method, is executed simultaneously with the communication parameter setting processing.

Upon simultaneous execution, for example, a random number used in message exchange processing of the communication parameter setting processing is also used as that of the key exchange processing. Hence, at the timing when F1502 ends, apparatuses A and B share a pairwise key. After completion of the automatic communication parameter setting processing, group key exchange processing is executed (F1503). As described above, the fourth method is characterized in that the key exchange processing is executed together in the automatic communication parameter setting processing.

With the fourth method, since pairwise keys between apparatuses are different even in an identical network, the security can be improved. Since processing equivalent to 4-way handshake processing is executed in the communication parameter setting processing, the total connection time can be shortened.

In this description, the group key exchange processing is separately executed. However, when the group key exchange processing is also executed in the communication parameter setting processing, the total connection time can be further shortened.

As for the aforementioned five methods including that compliant with the IEEE802.11i, a system may select one of these methods, and information indicating a method to be used included in communication parameters may be provided. Also, these methods may be dynamically switched depending on the mode of automatic communication parameter setting processing.

Figure 16:
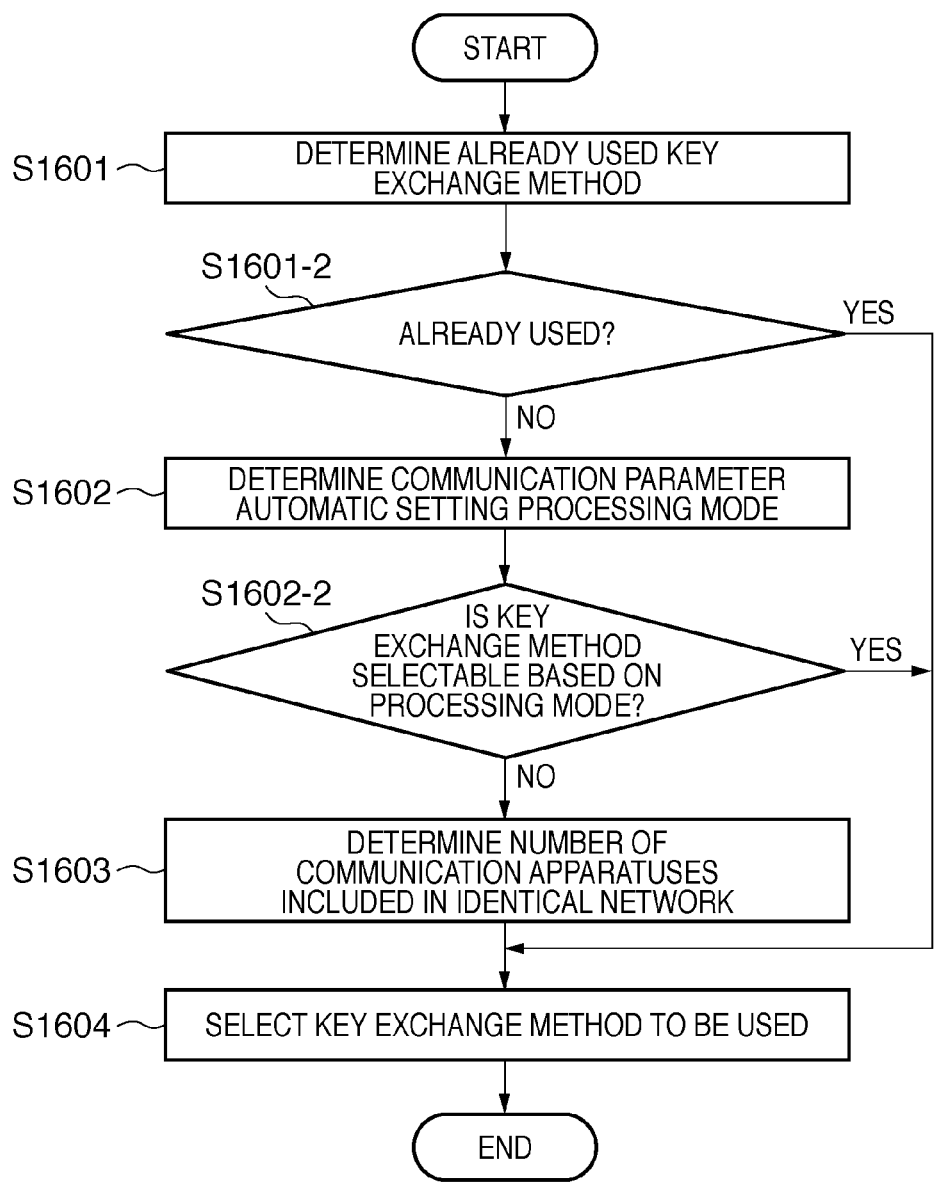
FIG. 16 is a flowchart showing a key exchange algorithm selection algorithm.

A case will be described below with reference to FIG. 16 wherein the methods are dynamically switched depending on the mode of the automatic communication parameter setting processing.

Assume that WPA-PSK, WPA2-PSK, or the like, which requires key exchange processing, is selected as communication parameters by the automatic communication parameter setting processing. In this case, a key exchange method which is already used in a network is determined (S1601). With this determination processing, if an arbitrary key exchange method is already selected (Yes in S1601-2), that method is used intact. If no method is especially selected (No in S1601-2), an automatic communication parameter setting processing mode is determined (S1602).

The processing mode includes, for example, a mode in which communication parameters set by the automatic communication parameter setting processing are permanently used, or the communication parameters are used as temporary session information. For example, in case of the processing mode which permanently uses the set communication parameters (a mode which uses identical communication parameters when a wireless communication is made again after the power supply is turned off), a method which assures high security (e.g., the first method or fourth method) is selected. In case of the mode which uses the communication parameters as temporary session information (a mode which erases or disables the set communication parameters once the power supply is turned off), a method which prioritizes the processing load over security (e.g., the second method or third method) may be selected.

If a key exchange method to be used is not settled based on the processing mode (No in S1602-2), the number of communication apparatuses included in an identical network is determined (S1603). Then, a suited key exchange method is selected based on the number of communication apparatuses (S1604). For example, in case of two communication apparatuses, the method fully compliant with the IEEE802.11i is selected. In case of three or more communication apparatuses, the WPA-None may be selected.

As described above, according to this embodiment, when the setting button of an apparatus as a participant of a network is operated, that apparatus serves as a providing apparatus and executes communication parameter providing processing. For this reason, when the user selects an arbitrary apparatus without regarding a providing apparatus or receiving apparatus from those as participants of the network, a new apparatus can receive provided communication parameters.

That is, by operating the setting button of an arbitrary apparatus without selecting any providing apparatus, a new apparatus can be added to the network. Since the increased beacon transmission frequency is restored after completion of the providing processing, consumption power required for beacon transmission can be reduced. Note that when the beacon transmission frequency is restored immediately after the beginning of the communication parameter providing processing, consumption power required for beacon transmission can be reduced more efficiently.

When a new apparatus is added to the network after the communication parameters are easily and securely provided, options about key exchange algorithms are increased, and a key exchange algorithm is automatically determined and set, thus lowering user's stress upon forming a network. Also, a network can be securely, easily, and quickly formed.

Second Embodiment

In the second embodiment attention is focused on whether a new communication parameter encryption key, which directly influences the security level, is to be generated or an already held encryption key will be re-used. In this embodiment, whether or not a new encryption key included in communication parameters to be provided is generated is determined based on the participation status of a communication apparatus in a network. All the arrangements are the same as the first embodiment, except that some processes are added to checking processing. The checking processing as to whether or not to generate a new encryption key as a characteristic feature of the second embodiment will be described below with reference to FIGS. 8A and 8B which have already been explained in the first embodiment.

If it is determined in step S802 in FIG. 8A that a given apparatus is a participant of a network, an encryption key, especially, of communication parameters to be provided by communication parameter providing processing (to be described later) is not newly created. In this case, an encryption key common to the network in which the apparatus is already a participant is provided as a part of communication parameters.

If it is determined that the given apparatus does not participate in any network, a new encryption key of communication parameters to be provided by the communication parameter providing processing (to be described later) is generated. In this case, the new encryption key is generated randomly.

When generating the encryption key randomly, for example, assume that a random function called "S-box" which irregularly generates an output with respect to an input, and whose operation is difficult to analyze is used. By generating an encryption key based on such a random function, an identical encryption key can be prevented from being re-used, thus enhancing the secrecy of the network.

The meaning of "a participant of a network" will now be explained.

"A participant of a network" refers to a case in which, for example, when a communication apparatus executes a so-called active scan by transmitting a search signal (probe request), it receives a search reply signal (probe response) from a communication apparatus which:
- possesses the same BSSID as that of its own communication apparatus; and
- has a different MAC address.

Note that partner apparatus search processing may be executed by a so-called passive scan by only observing a notification signal (beacon) or search reply signal (probe response) from a partner apparatus in place of the active scan. Even in case of the passive scan, a case in which a communication apparatus which possesses the same BSSID as that of the communication apparatus itself and has a different MAC address is discovered is regarded as "a participant of the network".

When not only a communication apparatus which possesses the same BSSID and has a different MAC address is discovered but also a communication with that apparatus using an upper layer is allowed, it may be determined as "a participant of the network". That is, even when a communication apparatus which possesses the same BSSID and has a different MAC address is discovered, if a communication using an upper layer is not allowed, it is determined as "not a participant of any network". For example, upon transmission of a Ping request using "Ping" as an example of a network layer application, when a Ping response is returned, the already created encryption key is provided. When a Ping response is not returned, processing for creating a new encryption key may be executed. The aforementioned processing will be described below with reference to FIG. 17.

Figure 17:
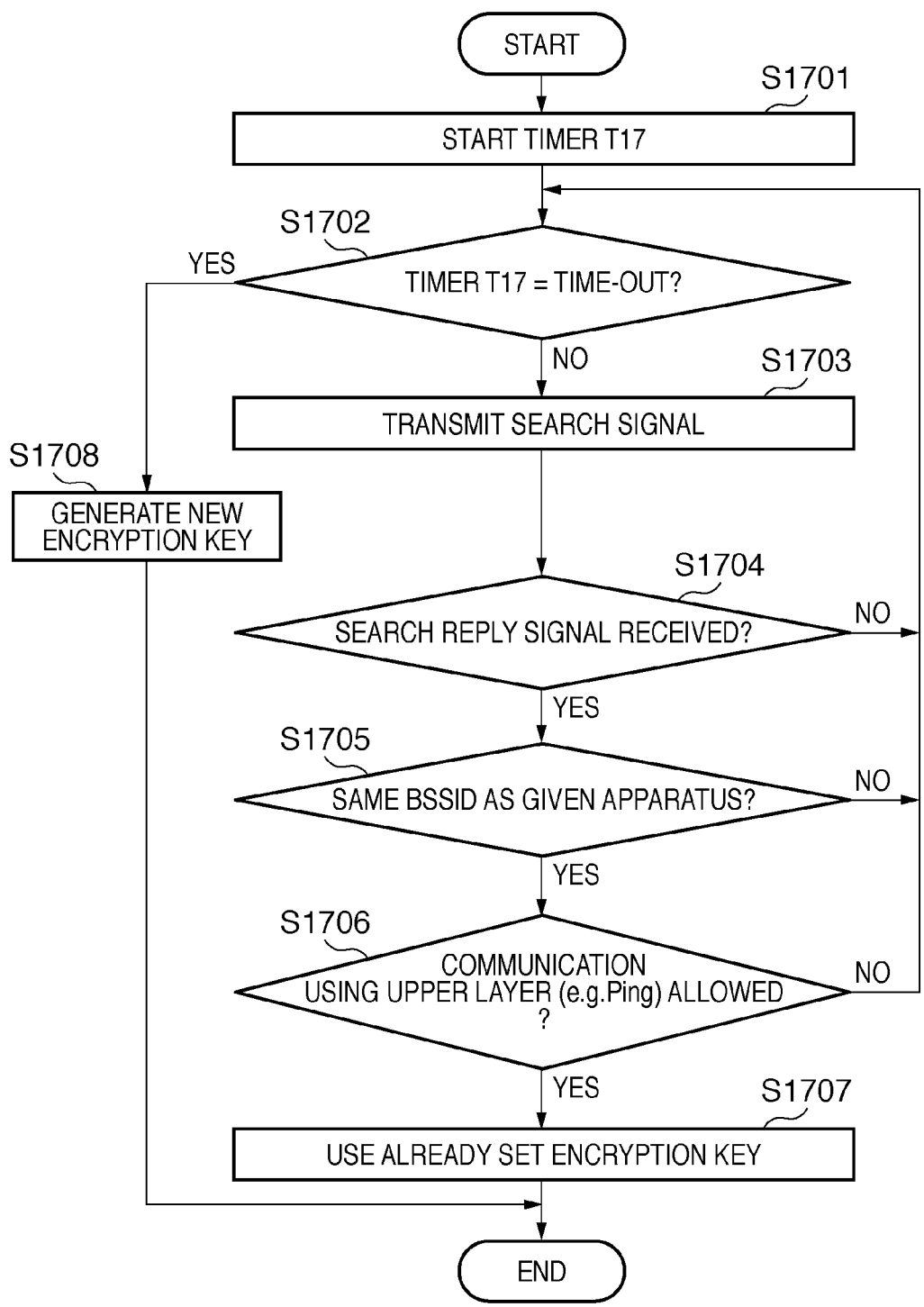
FIG. 17 is a flowchart showing new encryption key generation checking processing according to the second embodiment.

FIG. 17 is a detailed flowchart of checking processing as to whether or not a given apparatus is a participant of a network in step S802 in FIG. 8A and processing for determining an encryption key to be provided in step S822 based on the checking result.

A given apparatus starts an execution timer T17 of search processing (S1701). The apparatus confirms whether or not the timer T17 has reached a time-out (S1702). If the timer has reached a time-out, it is determined that the providing apparatus is not a participant of any network, and a new encryption key is generated using the aforementioned random function or the like (S1708).

On the other hand, if the timer T17 has not reached a time-out yet in step S1702, the apparatus transmits a search signal (probe request) to execute the search processing (S1703). The apparatus checks whether or not it has received a search reply signal to this search signal (S1704). If no search reply signal is received, the process returns to step S1702 to repeat the search processing until the timer T17 reaches a time-out.

If a search reply signal is received in step S1704, the result of the search reply signal is checked to see whether or not the contents of the search reply signal include the same BSSID as the communication apparatus itself and a MAC address different from that of the communication apparatus (S1705). As a result of checking, if the search reply signal includes a different BSSID, the process returns to step S1702 to repeat the search processing until the timer T17 reaches a time-out.

If a communication apparatus having the same BSSID and a different MAC address is detected in step S1705, the apparatus checks if it can communicate with that communication apparatus using an upper layer (S1706). As the communication using the upper layer, as described above, it is checked whether or not a Ping Resp. is returned upon transmission of, for example, a Ping Req. If it is determined in step S1706 that the communication using the upper layer level cannot be made, the process returns to step S1702 to redo network search processing.

On the other hand, if it is determined in step S1706 that communication using the upper layer can be made, an encryption key, which is currently set by the communication apparatus itself, is used intact as a communication parameter to be provided without generating any new encryption key, so as to maintain the network (S1707). In this way, communication parameters including the encryption key determined in step S1707 or S1708 in FIG. 17 are provided to the receiving apparatus by the communication parameter providing processing in step S822 in FIG. 8B.

As described above, whether an encryption key to be provided is newly generated or is used commonly is determined depending on whether or not the apparatus is a participant of the network.

By executing new encryption key creation control, the security when executing the automatic communication parameter setting processing can be enhanced. Note that the user may select to skip the aforementioned new encryption key creation control.

By executing the aforementioned new encryption key creation control, a key can be changed for each communication connection processing. This can enhance the communication security compared to a case of perpetual use of a common key.

As described above, according to this embodiment, an encryption key included in communication parameters can be updated without impairing user's convenience.

Third Embodiment

In the third embodiment attention is focused on a case in which a judgment is made as to whether or not the apparatus is a participant of a network by checking whether or not a communication parameter setting processing is executed immediately after the power supply of a communication apparatus is turned on. When the first communication parameter setting processing immediately after power-ON is executed, it is determined that the given apparatus is not a participant of any network. On the other hand, in the case of a second or subsequent communication parameter setting processing after power-ON, it is determined that the given apparatus is a participant of a network defined by communication parameters set by communication parameter setting processing executed before the current processing. Hence, in this embodiment, the encryption key is generated at the time of execution of the first communication parameter providing processing after power-ON of the communication apparatus itself, and is not re-generated at the time of the second or subsequent communication parameter providing processing.

As an implementation method, all communication parameters or only an encryption key of the communication parameters may be discarded at the time of power-OFF of a communication apparatus without being saved in a nonvolatile memory such as the storage unit 103.

All the arrangements are the same as the first embodiment, except that some processes are added to checking processing. The checking processing as a characteristic feature of the third embodiment will be described below with reference to FIGS. 8A and 8B which have already been explained in the first embodiment.

Figure 18:
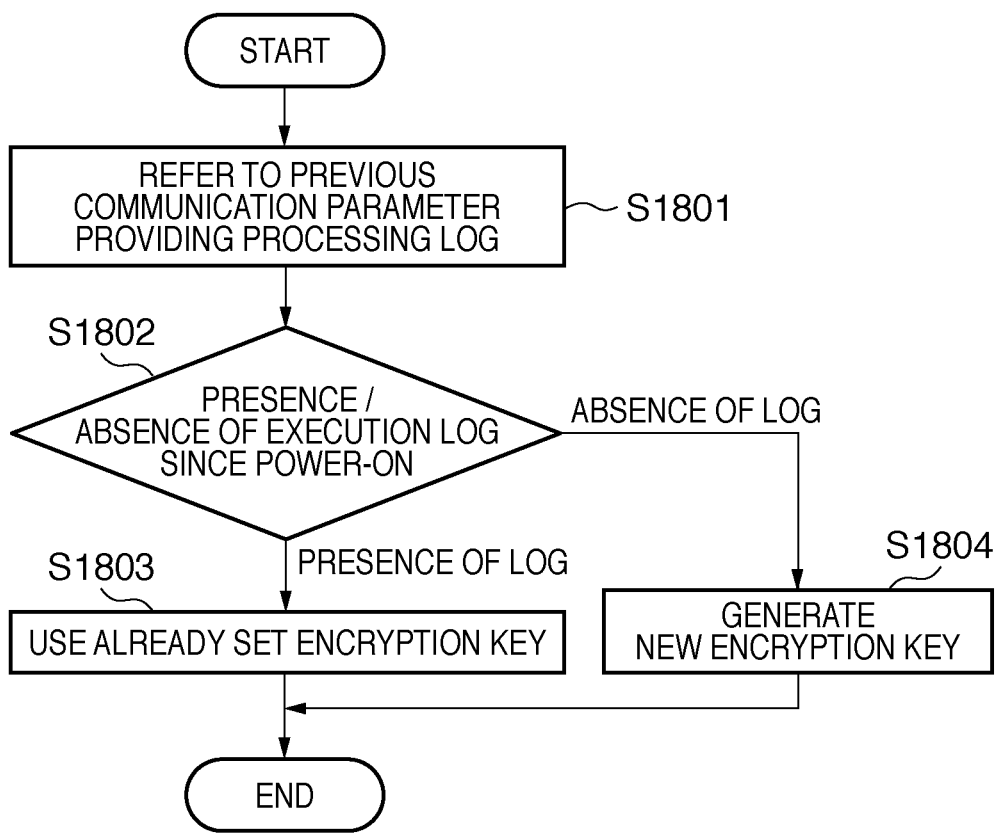
FIG. 18 is a flowchart showing new encryption key generation checking processing according to the third embodiment.

FIG. 18 is a detailed flowchart of checking processing as to whether or not a given apparatus is a participant of a network in step S802 in FIG. 8A and processing for determining an encryption key to be provided in step S822 based on the checking result.

The given apparatus refers to a log of communication parameter providing processing it has conducted previously (S1801). Assume that the log records operation logs of the communication parameter providing processing and receiving processing in the communication apparatus. The log may be initialized at the time of power-OFF of the communication apparatus. Alternatively, logs of power-OFF and ON of the communication apparatus may be time-serially recorded together with the operation logs of the communication parameter providing processing and receiving processing. The form of the log is not particularly limited as long as it is a record used to confirm the presence/absence of execution of the communication parameter providing processing since power-ON of the communication apparatus.

The given apparatus confirms the presence/absence of the execution log of the communication parameter providing processing since power-ON (S1802). If the execution log is present, a current encryption key, which is already set by the communication apparatus, is used intact as a communication parameter (S1803). On the other hand, if no execution log is present in step S1802, a new encryption key is generated (S1804). Assume that the new encryption key is generated using the random function, as described in the second embodiment.

In this way, communication parameters including the encryption key determined in step S1803 or S1804 in FIG. 18 are provided to the receiving apparatus by the communication parameter providing processing in step S822 in FIG. 8B. If the providing processing is completed normally, the log records information indicating that the communication parameter providing processing is normally completed. On the other hand, if the communication parameter providing processing is not normally completed, the processing ends without recording any information in the log.

In this manner, whether an encryption key to be provided is newly generated or is used commonly is determined depending on the presence/absence of execution of communication parameter providing processing after power-ON of the communication apparatus.

As described above, according to the third embodiment, an encryption key included in communication parameters can be updated at an appropriate timing without any user consideration given to the state of an apparatus.

Fourth Embodiment

The first and second embodiments include:
case in which a new ad hoc network is configured, and the automatic communication parameter setting processing is executed, as shown in FIG. 4; and a case in which an apparatus is added to the pre-established ad hoc network using the automatic communication parameter setting processing, as shown in FIG. 9. These two types of processing are distinguished based on checking processing as to whether or not the given apparatus is already a participant of a network in step S802 in FIG. 8A.

That is, in the second embodiment, whether or not the given apparatus is a participant of a network is checked as a participation status in the network. In the fourth embodiment, the participation status is determined based on an operation mode when the given apparatus participates in a network or configures a network. This embodiment will explain a case in which the processing is switched by designating one of two modes, that is, an initial setting information mode and an additional setting information mode. Note that the initial setting information mode indicates a case in which a new ad hoc network is configured, and the automatic communication parameter setting processing is executed. On the other hand, the additional setting information mode indicates a case in which an apparatus is added to the pre-established ad hoc network using the automatic communication parameter setting processing.

Assume that the user designates the aforementioned two modes when he or she starts the automatic communication parameter setting processing. Also, some apparatuses may be controlled to always operate in the initial setting information mode. For example, in one use, the initial setting information mode may always be designated for a headset which does not have any user interface that allows the user to designate the mode.

FIG. 19 is a flowchart for explaining the processing sequence of a communication apparatus in this case. In FIG. 19, step S802 is excluded from FIG. 8A, and step S1901 is added. Hence, the processes in step S801 and steps S803 to S827 are the same as those in FIGS. 8A and 8B.

Hence, only a difference from FIGS. 8A and 8B will be described in association with FIG. 19.

The setting button 106 which indicates the start of communication parameter setting processing is pressed (S801).

The apparatus on which the setting button 106 has been pressed checks if its operation mode is the initial setting information mode or additional setting information mode (S1901).

If its operation mode is the additional setting information mode, the given apparatus sets "providing apparatus" as its role (S820), starts beacon transmission (S821), and starts communication parameter providing processing with another new apparatus (S822) so as to control the new apparatus to participate in the active network. Note that when the given apparatus is already a participant of the network at present, it launches the aforementioned start notification processing shown in FIG. 6.

It is clearly specified that a beacon (notification signal), search signal (probe request), and search reply signal (probe response) include the following information elements as mandatory elements or options depending on signals:

an information element which notifies that the given apparatus has an automatic communication parameter setting processing function or the processing is in progress;

an information element indicating the role; and an information element indicating whether or not a providing function is active.

If it is determined in step S1901 that its operation mode is the initial setting information mode, the given apparatus creates a network to arbitrate the operation roles (S803), sets "providing apparatus candidate" as the role (S804), and starts the timer T1 used in role arbitration (S805).

The subsequent description will not be repeated since it is the same as that in the first and second embodiments. All the arrangements except for FIGS. 8A and 8B are the same as those in the first and second embodiments. However, in the communication parameter providing processing in step S822, in the initial setting information mode, a new encryption key, which is generated using the aforementioned random function or the like in step S1708, is included in communication parameters. On the other hand, in the additional setting information mode, no new encryption key is generated, and the already set encryption key is included in communication parameters.

According to this embodiment, the automatic communication parameter setting processing can be executed according to the user's intention or the functions (for example, a user interface or the like) of a communication apparatus.

The preferred embodiments of the present invention have been described, but they are examples for the purpose of the description of the present invention, and the scope of the present invention is not limited to only these embodiments. Various modifications of the embodiments can be made without departing from the scope of the present invention.

In the examples described in the above embodiments, the CW value is changed to increase the number of times beacons are transmitted per unit time by the providing apparatus to be larger than other apparatuses. However, other parameters may be used as long as the providing apparatus can increase the number of times beacons are transmitted to be larger than other apparatuses. For example, if the beacon transmission interval (beacon cycle) can be changed, the providing apparatus decreases the beacon transmission interval, thus increasing the number of times beacons are transmitted per unit time.

In the above description, the CW is changed to be larger or smaller than the initial value. Since respective apparatuses do not always have the same CW initial value, if the CW is changed to a minimum value (CWmin) or maximum value (CWmax) within a changeable range, the beacon transmission frequency (the number of times) can be changed more reliably. The start notification message is described as a message that notifies that the automatic communication parameter setting processing is started.

However, the start notification message can also be expressed as a message which notifies the operation of the setting button 106 or a message that allows the providing apparatus to provide communication parameters to another receiving apparatus.

The above description has been given taking the wireless LAN compliant with the IEEE802.11 as an example. However, the present invention may be carried out for other wireless media such as wireless USB, MBOA, Bluetooth®, UWB, and ZigBee. Also, the present invention may be carried out for wired communication media such as a wired LAN.

Note that "MBOA" is an abbreviation for "Multi Band OFDM Alliance". Also, the UWB includes wireless USB, wireless 1394, WINET, and the like.

The network identifier, encryption method, encryption key, authentication method, and authentication key have been exemplified as the communication parameters. However, other kinds of information may be used, or other kinds of information may be included in the above communication parameters.

According to the present invention, even when the roles are not determined in advance in an automatic communication parameter setting processing, a communication parameter setting processing and a network join process can be appropriately executed without prompting the user to select the roles of the apparatuses.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-244947, filed Sep. 24, 2008, which is hereby incorporated by reference herein in its entirety.

The invention claimed is:

1. A communication apparatus comprising a processor configured to:
   execute processing for providing communication parameters to another apparatus which does not join a wireless network where the communication apparatus joins, according to a predetermined communication protocol;
   generate an encryption key included in the communication parameters; and
   confirm whether or not the processing for providing communication parameters to the another apparatus has already been executed based on providing history information,
   wherein the processing for providing the communication parameters provides the another apparatus with the communication parameters including a newly generated encryption key in a case where it is confirmed that the processing has not been executed yet, and provides the another apparatus with the communication parameters without generating a new encryption key in a case where it is confirmed that the processing has already been executed.

2. The apparatus according to claim 1, wherein the processor is further configured to provide an existing encryption key in a case where the providing history information indicates that the communication parameters have already been provided after a power supply of the communication apparatus is turned on, and provide the newly generated encryption key in a case where the providing history information indicates that the communication parameters are provided for a first time after the power supply to the communication apparatus is turned on.

3. The apparatus according to claim 1, wherein the processor is further configured to record, as the providing history information, a result of executing the processing for providing the communication parameters.

4. The apparatus according to claim 3, wherein, in a case where the processing for providing the communication parameters is completed, the result of the processing is recorded as the providing history information.

5. The apparatus according to claim 3, wherein, in a case where the processing for providing the communication parameters is not normally completed, the result of the processing is not recorded as the providing history information.

6. The apparatus according to claim 1, wherein the processor is configured to confirm whether or not the processing for providing communication parameters to the another apparatus has already been executed after a power supply of the communication apparatus is turned on based on the providing history information.

7. The apparatus according to claim 1, wherein the processor is configured to confirm whether or not the processing for providing communication parameters to the another apparatus has already been executed, based on whether an execution log of the processing for providing the communication parameters is present or absent in the providing history information after a power supply of the communication apparatus is turned on,
   wherein the processing for providing the communication parameters provides the another apparatus with the newly generated encryption key in a case where the execution log is absent, and provides the another apparatus with an existing encryption key in a case where the execution log is present.

8. A method of controlling a communication apparatus, the method comprising:
   performing processing for providing communication parameters to another apparatus which does not join a wireless network where the communication apparatus joins, according to a predetermined communication protocol;
   generating an encryption key included in the communication parameters; and
   confirming whether or not the processing for providing communication parameters to the another apparatus has already been executed based on providing history information,
   wherein the communication parameter including a newly generated encryption key is provided to the another apparatus in a case where it is confirmed that the processing has not been executed yet, and the communication parameter is provided to the another apparatus without generating a new encryption key in a case where it is confirmed that the processing has already been executed.

9. The method according to claim 8, wherein an existing encryption key is provided in a case where the providing history information indicates that the communication parameters have already been provided according to the predetermined communication protocol after a power supply of the communication apparatus is turned on, and the newly generated encryption key is provided in a case where the providing history information indicates that the communication parameters are provided for a first time after the power supply of the communication apparatus is turned on.

10. The method according to claim 8, further comprising recording a result of executing the processing for providing the communication parameters as the providing history information.

11. The method according to claim 10, wherein, in a case where the processing for providing the communication parameters is completed, the result of the processing is recorded as the providing history information.

12. The method according to claim 10, wherein, in a case where the processing for providing the communication parameters is not normally completed, the result of the processing is not recorded as the providing history information.

13. A non-transitory computer-readable storage medium storing a computer program for making a computer execute a control method for controlling a communication apparatus, the method comprising:

performing processing for providing communication parameters to another apparatus which does not join a wireless network where the communication apparatus joins, according to a predetermined communication protocol;

generating an encryption key included in the communication parameters; and confirming whether or not the processing for providing communication parameters to the another apparatus has already been executed based on providing history information, wherein the communication parameter including a newly generated encryption key is provided to the another apparatus in a case where it is confirmed that the processing has not been executed yet, and the communication parameter is provided to the another apparatus without generating a new encryption key in a case where it is confirmed that the processing has already been executed.

\* \* \* \* \*